US012723158B2

(12) United States Patent
Tanaka et al.

(10) Patent No.: US 12,723,158 B2
(45) Date of Patent: Sep. 1, 2026

(54) PIGMENT AND METHOD FOR PRODUCING SAME, SOLUTION, METAL HYDROXYL AMOUNT EVALUATION METHOD, AND METAL HYDROXYL PROCESSING RATE EVALUATION METHOD

(71) Applicants: SUMITOMO OSAKA CEMENT CO., LTD., Tokyo (JP); Kyoto University, Kyoto (JP)

(72) Inventors: Kazuo Tanaka, Kyoto (JP); Masayuki Gon, Kyoto (JP); Yoshiki Chujo, Kyoto (JP); Ryo Takeda, Tokyo (JP); Tomomi Ito, Tokyo (JP); Kenji Harada, Tokyo (JP)

(73) Assignees: SUMITOMO OSAKA CEMENT CO., LTD., Tokyo (JP); Kyoto University, Kyoto (JP)

( * ) Notice: Subject to any disclaimer, the term of this patent is extended or adjusted under 35 U.S.C. 154(b) by 42 days.

(21) Appl. No.: 18/730,317

(22) PCT Filed: Feb. 24, 2023

(86) PCT No.: PCT/JP2023/006744
§ 371 (c)(1),
(2) Date: Jul. 19, 2024

(87) PCT Pub. No.: WO2023/163108
PCT Pub. Date: Aug. 31, 2023

(65) Prior Publication Data

US 2025/0101231 A1 Mar. 27, 2025

(30) Foreign Application Priority Data

Feb. 24, 2022 (JP) ................................ 2022-026890

(51) Int. Cl.
*C09B 45/22* (2006.01)
*C09B 57/10* (2006.01)
(Continued)

(52) U.S. Cl.
CPC .............. *C09B 45/22* (2013.01); *C09B 57/10* (2013.01); *C09C 3/08* (2013.01); *G01N 21/31* (2013.01); *C01P 2002/84* (2013.01)

(58) Field of Classification Search
CPC ........... C09B 45/22; C09B 57/10; C09C 3/08; G01N 21/32; G01N 21/31; C01P 2002/84
See application file for complete search history.

(56) References Cited

FOREIGN PATENT DOCUMENTS

| | | | |
|---|---|---|---|
| JP | H07260693 A * | 10/1995 | ............. G01N 21/78 |
| JP | 2007051188 | 3/2007 | |
| WO | 2017130632 | 8/2017 | |

OTHER PUBLICATIONS

Karl Eberhard Besslera, Jennifer Alves dos Santos, Victor Marcelo Deflon, Sebastiao de Souza Lemos, and Elke Niquet, Organotin Dyes: Synthesis and Structural Characterization of Dibutyltin and Dimethyltin Complexes with 2,2'-Dihydroxyazobenzene, Z. Anorg. Allg. Chem. 2004, 630, 742745 (Year: 2004).*

(Continued)

*Primary Examiner* — Bijan Ahvazi
(74) *Attorney, Agent, or Firm* — JCIPRNET

(57) ABSTRACT

A pigment of the present invention is a compound represented by General Formula (1) or General Formula (2)

(Continued)

(1)

(2)

(3)

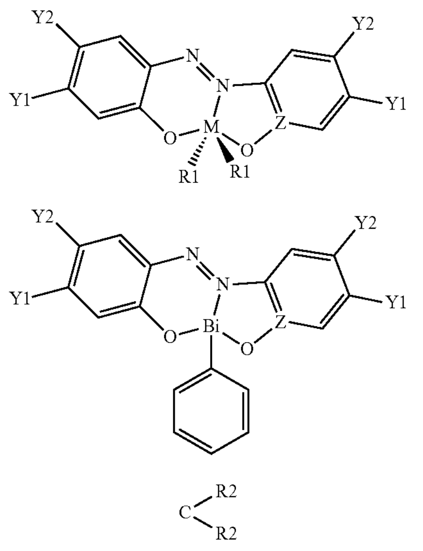

(in the above-described formulae, M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3), where R2 is an alkyl group or a phenyl group).

12 Claims, 4 Drawing Sheets

(51) Int. Cl.
*C09C 3/08* (2006.01)
*G01N 21/31* (2006.01)

(56) References Cited

OTHER PUBLICATIONS

Jimena S. Zugazagoitia, and Jorge Peon, Excited-State Dynamics and Two-Photon Absorption Cross Sections of FluorescentDiphenyl-TinIV Derivatives with Schiff Bases: A Comparative Study of the Effect of Chelation from the Ultrafast to the Steady-State Time Scale, J. Phys. Chem. A 2010, 114, 704-714. (Year: 2009).*

Masayuki Gon, Kazuo Tanaka, and Yoshiki Chujo, Vapochromic Luminescent π-Conjugated Systems with Reversible Coordination-Number Control of Hypervalent Tin(IV)-Fused Azobenzene Complexes, Chem. Eur. J. 2021, 27, 7561-7571. (Year: 2021).*

Karl Eberhard Bessler et al., "Organotin Dyes: Synthesis and Structural Characterization of Dibutyltin and Dimethyltin Complexes with 2, 2'-Dihydroxyazobenzene", Zeitschrift Fuer Anorganische Und Allgemeine Chemie., Apr. 20, 2004, pp. 742-745, vol. 630, No. 5.

Jimena S. Zugazagoitia et al., "Excited-State Dynamics and Two-Photon Absorption Cross Sections of Fluorescent Diphenyl-TinIV Derivatives with Schiff Bases: A Comparative Study of the Effect of Chelation from the Ultrafast to the Steady-State Time Scale", Journal of Physical Chemistry A., Jan. 21, 2010, pp. 704-714, vol. 114, No. 2.

"International Search Report (Form PCT/ISA/210) of PCT/JP2023/006744", mailed on May 16, 2023, with English translation thereof, pp. 1-4.

Tahereh Sedaghat et al., "Synthesis, spectral, and thermal studies of organotin(IV) complexes with 4-bromo-2-{[(2-hydroxyphenyl)imino]methyl}phenol", Main Group Chemistry, Jun. 2009, pp. 1-11.

Jai Devi et al., "Synthesis, characterisation, in vitro antimicrobial, antioxidant and anti-inflammatory activities of diorganotin(IV) complexes derived from salicylaldehyde Schiff bases", Research on Chemical Intermediates, Apr. 15, 2019, pp. 3943-3968, vol. 45.

Claudio Pettinari et al., "Synthesis and characterisation of tin(IV) and organotin(IV) derivatives 2-{[(2-hydroxyphenyl)imino]methyl}phenol", Inorganica Chimica Acta, Dec. 3, 2001, pp. 103-114, vol. 325, Issues 1-2.

Smita Basu et al., "Neutral penta-coordinated diorganotin(IV) complexes derived from orthoaminophenol Schiff bases: Synthesis, characterization and molecular structures", Journal of Organometallic Chemistry, Aug. 15, 2010, pp. 2098-2104, vol. 695, Issue 18.

Norberto Farfán et al., "Preference of di-n-butyltinIV compounds to build O•••Sn bonds in fused rings with five-six members", Journal of Organometallic Chemistry, Nov. 1, 2004, pp. 3481-3491, vol. 689, Issue 22.

Alex A. Diamantis et al., "Crystallographic Studies of Diphenylgermanium, Diphenyltin and Diphenyllead Compounds Containing the Dinegative Ligand Derived from Salicylideneamino-o-Hydroxybenzene: Ph2M (OC6H4CH=NC6H4O)", Phosphorus, Sulfur, and Silicon and the Related Elements, Mar. 17, 2008, pp. 251-259, vol. 150, Issue 1.

Katsuhiko Kawakami et al., "Remarkable Configurational Changes of Some Dimethyltin Complexes Derived From Ono Tridentate Schiff Bases in Strong Donor Solvents", Journal of Organometallic Chemistry, Mar. 1, 1973, pp. 409-415, vol. 49, Issue 2.

* cited by examiner

PIGMENT AND METHOD FOR PRODUCING SAME, SOLUTION, METAL HYDROXYL AMOUNT EVALUATION METHOD, AND METAL HYDROXYL PROCESSING RATE EVALUATION METHOD

CROSS-REFERENCE TO RELATED APPLICATION

This application is a 371 application of the International PCT application serial no. PCT/JP2023/006744, filed on Feb. 24, 2023, which claims the priority benefits of Japan Patent Application No. 2022-026890, filed on Feb. 24, 2022. The entirety of each of the above-mentioned patent applications is hereby incorporated by reference herein and made a part of this specification.

TECHNICAL FIELD

The present invention relates to a pigment, a method for producing the same, a solution containing the pigment, a metal hydroxyl amount evaluation method, a metal hydroxyl treatment proportion, and a metal hydroxyl residual proportion evaluation method.

BACKGROUND ART

Metal oxide particles such as zinc oxide particles are added to various compositions and other substances in order to impart functions such as ultraviolet shielding properties and gas barrier properties.

In a case where the metal oxide particles are applied to the compositions, the metal oxide particles are surface-treated with a surface treatment agent in order to adjust the surface of the metal oxide particles according to the properties of the composition or to reduce the catalytic activity of the metal oxide particles.

For example, in a case where zinc oxide particles are blended with an oil-based cosmetic, an emulsion-type oil-phase, or the like, the zinc oxide particles are surface-treated with a silane coupling agent having an alkoxy group or the like are used (Patent Literatures Nos. 1 and 2).

CITATION LIST

Patent Literature

[Patent Literature No. 1] International Publication No. WO2017/130632

[Patent Literature No. 2] Japanese Laid-open Patent Publication No. 2007-51188

SUMMARY OF INVENTION

Technical Problem

In the related art, it was confirmed that the metal oxide particles have been surface-treated with the surface treatment agent such as a silane coupling agent based on the improvement on the dispersibility of the metal oxide particles such as zinc oxide particles to the oil phase. However, there are no methods of quantitative approaches to accurately confirm the proceeding degree of the surface treatment on the metal oxide particles.

In the related art, as a method for quantifying a hydroxyl group on the surface of a metal oxide particle, an infrared spectroscopy (FT-IR) has been known. However, errors are likely to occur because FT-IR is easily affected by moisture contained in a measurement sample. In addition, in a case where a peak of the hydroxyl group and a peak of another functional group overlap with each other, it is difficult to quantify only the peak of the hydroxyl group. Therefore, it is difficult to simply and accurately evaluate the hydroxyl group on the surface of the metal oxide particle by FT-IR.

In addition, a method using a Grignard reaction is known as a method for quantifying the hydroxyl group on the surface of the metal oxide particle. However, the evaluation is complicated because the Grignard reaction needs to be evaluated in an inert atmosphere by using a highly active reagent and a dedicated instrument. In addition, it is difficult to accurately measure the amount of the hydroxyl group on the surface of the metal oxide particle because the moisture in the atmosphere reacts with the reagent.

As a method for evaluating the hydrophobic state of the surface of the metal oxide particle, there is a limit ethanol method. The limit ethanol method can facilitate the evaluation, but is difficult to perform a quantitative evaluation.

Therefore, there has been a demand for a method for evaluating the state of the surface of a metal oxide particle in a simple and accurate manner.

The present invention has been made in view of the above circumstances, and an object of the present invention is to provide a pigment that is adopted to adsorb to a hydroxyl group (hereinafter, sometimes referred to as a "metal hydroxyl group") bonded to a metal atom, and a method for producing the pigment, a solution containing the pigment, a metal hydroxyl amount evaluation method using the pigment, and a metal hydroxyl treatment proportion evaluation method.

Solution to Problem

That is, a pigment according to a first aspect of the present invention is a compound represented by General Formula (1) or General Formula (2).

(1)

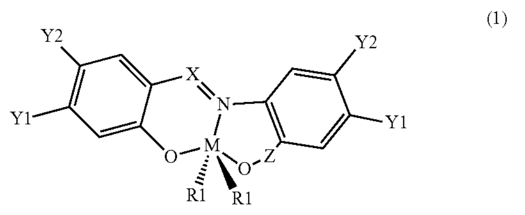

(In Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3))

(2)

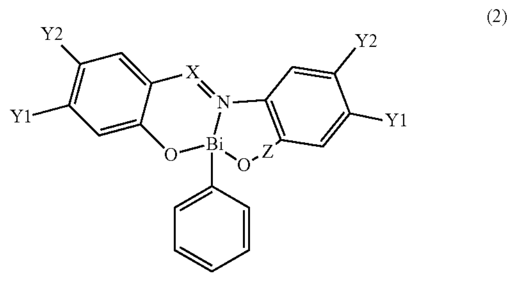

(In Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3))

(3)

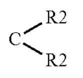

(In Formula (3), R2 is an alkyl group or a phenyl group)

A method for producing a pigment according to a second aspect of the present invention is a method for producing a pigment of the present invention, the method including a mixing step of mixing a ligand represented by General Formula (4) or a ligand represented by General Formula (5) and a metal source represented by General Formula (6), and a coordinating step of coordinating the ligand represented by General Formula (4) or the ligand represented by General Formula (5) with the metal source represented by General Formula (6).

(4)

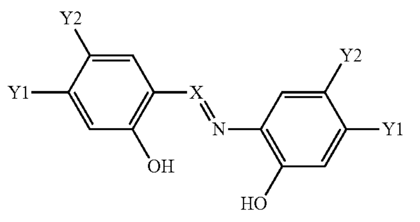

(In Formula (4), X is C or N, and Y1 and Y2 are each hydrogen, a halogen group, a methyl group, an alkoxy group, a phenyl group, a diphenylamide group, a thiophenyl group, or a phenylethynyl group)

(5)

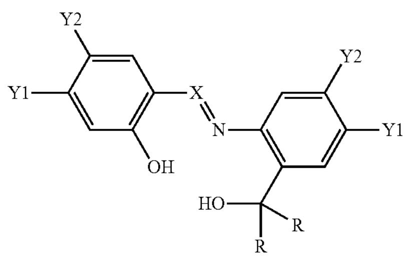

(In Formula (5), X is C or N, Y1 and Y2 are each hydrogen, a halogen group, a methyl group, an alkoxy group, a phenyl group, a diphenylamide group, a thiophenyl group, or a phenylethynyl group, and R is an alkyl group or a phenyl group)

(6)

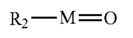

(In Formula (6), M is at least one selected from the group consisting of Sn, Ge, and Bi, and R is an alkyl group or a phenyl group)

A method for producing a pigment according to a third aspect of the present invention is a method for producing a pigment of the present invention, the method including a mixing step of mixing a ligand represented by General Formula (4) or a ligand represented by General Formula (5), a metal source represented by General Formula (7), a base, and an organic solvent, and a coordinating step of coordinating the ligand represented by General Formula (4) or the ligand represented by General Formula (5) with the metal source represented by General Formula (7).

(4)

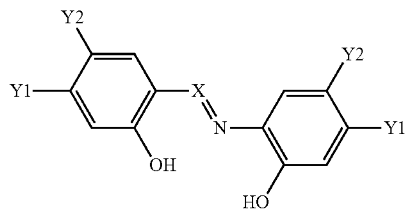

(In Formula (4), X is C or N, and Y1 and Y2 are each hydrogen, a halogen group, a methyl group, an alkoxy group, a phenyl group, a diphenylamide group, a thiophenyl group, or a phenylethynyl group)

(5)

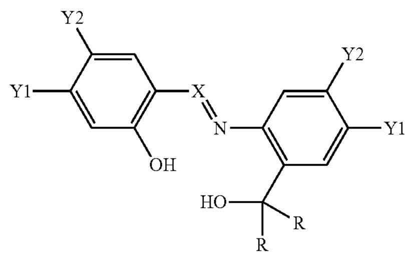

(In Formula (5), X is C or N, Y1 and Y2 are each hydrogen, a halogen group, a methyl group, an alkoxy group, a phenyl group, a diphenylamide group, a thiophenyl group, or a phenylethynyl group, and R is an alkyl group or a phenyl group)

(7)

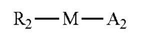

(In Formula (7), M is at least one selected from the group consisting of Sn, Ge, and Bi, R is an alkyl group or a phenyl group, and A is a halogen group)

A solution according to a fourth aspect of the present invention contains the pigment according to the first aspect of the present invention and an organic solvent.

A metal hydroxyl amount evaluation method according to a fifth aspect of the present invention includes a step of preparing the solution according to the fourth aspect of the present invention and a sample, a step of evaluating a color x of the solution, a step of adding the sample to the solution according to the fourth aspect of the present invention to prepare a mixed solution A and evaluating a color a of the mixed solution A, and a step of evaluating a difference between the obtained color x and color a and evaluating a metal hydroxyl amount of the sample from an evaluation result obtained.

A metal hydroxyl amount evaluation method according to a sixth aspect of the present invention includes a step of preparing the solution according to the fourth aspect of the present invention, a sample 1, and a sample 2, a step of adding the sample 1 to the solution according to the fourth aspect of the present invention to prepare a mixed solution A and evaluating a color a of the mixed solution A, a step of adding the sample 2 to the solution according to the fourth aspect of the present invention to prepare a mixed solution B and evaluating a color b of the mixed solution B, and a step of evaluating a difference between the obtained color a and the obtained color b and evaluating a difference between a metal hydroxyl amount a of the sample 1 and a metal hydroxyl amount b of the sample 2 from an evaluation result obtained.

A metal hydroxyl amount evaluation method according to a seventh aspect of the present invention includes a step of preparing a solution according to the fourth aspect of the present invention, a sample 1, and a sample 2, a step of evaluating a color x of the solution according to the fourth aspect of the present invention, a step of adding the sample 1 to the solution according to the fourth aspect of the present invention to prepare a mixed solution A and evaluating a color a1 of the mixed solution A, a step of adding the sample 2 to the solution according to the fourth aspect of the present invention to prepare a mixed solution B and evaluating a color b1 of the mixed solution B, a step of evaluating a difference between the color x and the color a1 obtained, and evaluating a metal hydroxyl amount a of the sample 1 from an evaluation result obtained, a step of evaluating a difference between the color x and the color b1 obtained, and evaluating a metal hydroxyl amount b of the sample 2 from an evaluation result obtained, and a step of evaluating a difference between the metal hydroxyl amount a and the metal hydroxyl amount b.

A metal hydroxyl treatment proportion evaluation method according to an eighth aspect of the present invention is a metal hydroxyl treatment proportion evaluation method for a surface of a metal oxide particle in a case where the metal oxide particle is surface-treated with a surface treatment agent, the method including a step of preparing the solution according to the fourth aspect of the present invention, a metal oxide particle 1 before the surface treatment, and a metal oxide particle 2 after the surface treatment is performed on the metal oxide particle 1, a step of measuring an absorbance x of the solution according to the fourth aspect of the present invention, a step of adding the metal oxide particle 1 before the surface treatment to the solution according to the fourth aspect of the present invention to prepare a mixed solution A and measuring an absorbance a1 of the mixed solution A, a step of adding the metal oxide particle 2 after the surface treatment to the solution according to the fourth aspect of the present invention to prepare a mixed solution B and measuring an absorbance b1 of the mixed solution B, a step of calculating a reduction proportion a2 of the absorbance of the mixed solution A by subtracting the absorbance a1 from the absorbance x to obtain a value and dividing the obtained value by the absorbance x ((x−a1)/x), a step of calculating a reduction proportion b2 of the absorbance of the mixed solution B by subtracting the absorbance b1 from the absorbance x to obtain a value and dividing the obtained value by the absorbance x ((x−b1)/x), a step of calculating an adsorption amount a3 (mol/g) of the pigment to the metal oxide particle 1 by multiplying the reduction proportion a2 of the absorbance by the number of moles of a pigment contained in the mixed solution A to obtain a value and dividing the obtained value by an addition amount of the metal oxide particle 1 to the solution A (a2×the number of moles of the pigment contained in the mixed solution A/the addition amount of the metal oxide particle 1 to the solution A), a step of calculating an adsorption amount b3 (mol/g) of the pigment to the metal oxide particle 2 by multiplying the reduction proportion b2 of the absorbance by the number of moles of the pigment contained in the mixed solution B to obtain a value and dividing the obtained value by an addition amount of the metal oxide particle 2 to the solution B (b2×the number of moles of the pigment contained in the mixed solution B/the addition amount of the metal oxide particle 2 to the solution B), and a step of calculating a metal hydroxyl treatment proportion obtained as a result of the surface treatment by dividing the adsorption amount b3 by the adsorption amount a3 to obtain a value, multiplying the obtained value by 100 to obtain a value, and subtracting the obtained value from 100 (100−((b3/a3)×100)).

A metal hydroxyl residual proportion evaluation method according to a ninth aspect of the present invention is a metal hydroxyl residual proportion evaluation method for a surface of a metal oxide particle in a case where the metal oxide particle is surface-treated with a surface treatment agent, the method including a step of preparing the solution according to the fourth aspect of the present invention, a metal oxide particle 1 before the surface treatment, and a metal oxide particle 2 after the surface treatment is performed on the metal oxide particle 1, a step of measuring an absorbance x of the solution according to the fourth aspect of the present invention, a step of adding the metal oxide particle 1 before the surface treatment to the solution according to the fourth aspect of the present invention to prepare a mixed solution A and measuring an absorbance a1 of the mixed solution A, a step of adding the metal oxide particle 2 after the surface treatment to the solution according to the fourth aspect of the present invention to prepare a mixed solution B and measuring an absorbance b1 of the mixed solution B, a step of calculating a reduction proportion a2 of the absorbance of the mixed solution A by subtracting the absorbance a1 from the absorbance x to obtain a value and dividing the obtained value by the absorbance x ((x−a1)/x), a step of calculating a reduction proportion b2 of the absorbance of the mixed solution B by subtracting the absorbance b1 from the absorbance x to obtain a value and dividing the obtained value by the absorbance x ((x−b1)/x), a step of calculating an adsorption amount a3 (mol/g) of the pigment to the metal oxide particle 1 by multiplying the reduction proportion a2 of the absorbance by the number of moles of a pigment contained in the mixed solution A to obtain a value and dividing the obtained value by an addition amount of the metal oxide particle 1 to the solution A ((a2×the number of moles of the pigment contained in the mixed solution A)/the addition amount of the metal oxide particle 1 to the solution A), a step of calculating an adsorption amount b3 (mol/g) of the pigment to the metal oxide particle 2 by multiplying the reduction proportion b2 of the absorbance by the number of moles of the pigment contained in the mixed solution B to obtain a value and dividing the obtained value by an addition amount of the metal oxide particle 2 to the solution B((b2×the number of moles of the pigment contained in the mixed solution B)/the addition amount of the metal oxide particle 2 to the solution B), and a step of calculating a metal hydroxyl residual proportion to be obtained as a result of the surface treatment by dividing the adsorption amount b3 by the adsorption amount a3 to obtain a value and multiplying the obtained value by 100 ((b3/a3)×100).

Advantageous Effects of Invention

According to the pigment of the present invention, since the pigment can adsorb to a metal hydroxyl group, it is possible to determine whether or not the sample contains a metal hydroxyl group.

The pigment of the present invention is obtained by the method for producing a pigment of the present invention.

Since the solution of the present invention contains the pigment of the present invention, it is possible to evaluate whether or not the sample contains a metal hydroxyl group.

The metal hydroxyl amount contained in the sample can be qualitatively and quantitatively evaluated according to the metal hydroxyl amount evaluation method of the present invention.

According to the metal hydroxyl treatment proportion evaluation method of the present invention, in a case where the metal oxide particle is surface-treated with the surface treatment agent, the metal hydroxyl treatment proportion of the surface of the metal oxide particle can be quantitatively evaluated.

DESCRIPTION OF EMBODIMENTS

Figure 1:
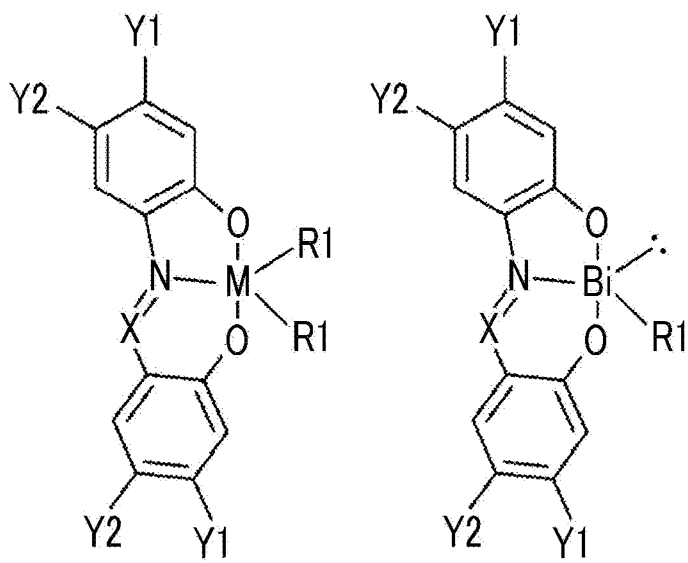
FIG. 1 is a diagram illustrating a compound represented by General Formula (1) and a compound represented by General Formula (2) side by side.

Embodiments of the present invention relating to a pigment, a method for producing the same, a solution containing the pigment, a metal hydroxyl amount evaluation method, and a metal hydroxyl treatment proportion evaluation method will be described.

The present embodiments are simply specific descriptions for better understanding of the gist of the invention and do not limit the present invention unless otherwise specifically described. Modifications, omissions, and additions in terms of numbers, quantities, positions, numerical values, proportions, types, orders, and the like can be made without departing from the spirit of the invention.

[Pigment]

A pigment of the present embodiment is a compound represented by General Formula (1) or General Formula (2)

(1)

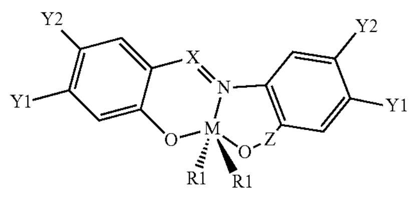

(In Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3))

(2)

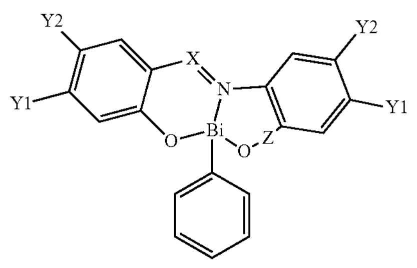

(In Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3))

(3)

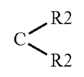

(In Formula (3), R2 is an alkyl group or a phenyl group)

In a case where R1 and/or R2 is an alkyl group, the alkyl group is not particularly limited as long as it does not reduce the reaction of causing the pigment of the present embodiment to be coordinated to a metal hydroxyl group. The alkyl group preferably has 1 or more carbon atoms, more preferably has 1 or more and 20 or less carbon atoms, still more preferably has 2 or more and 15 or less carbon atoms, and particularly preferably has 3 or more and 10 or less carbon atoms. The alkyl group may have 1 or more and 8 or less carbon atoms, 2 or more and 6 or less carbon atoms, 4 or more and 5 or less carbon atoms, or any other number of carbon atoms. Specific examples thereof include a methyl group, an ethyl group, a propyl group, an isopropyl group, a butyl group, an isobutyl group, a sec-butyl group, a pentyl group, a hexyl group, a heptyl group, an octyl group, a nonyl group, a decyl group, and other alkyl groups, but the present embodiment is not limited to these examples.

In the present embodiment, Y1 and Y2 are each exemplified by hydrogen, a halogen group, a methyl group, an alkoxy group, a phenyl group, a diphenylamide group, a thiophenyl group, or a phenylethynyl group. Y1 and Y2 are not particularly limited as long as each of Y1 and Y2 is a color-changing group depending on the electron withdrawing property, the electron donating property, and the conjugation extension. That is, Y1 and Y2 may be any group as long as the group is a colorable group.

For example, the number of carbon atoms in the alkoxy group can be optionally selected, and may be, for example, 1 or more and 10 or less, 2 or more and 5 or less, or 3 or more and 4 or less, but is not limited to these examples.

The halogen group is one selected from the group consisting of F, Cl, Br, and I. The halogen group is preferably F and/or Br, but is not limited to these examples.

Y1 and Y2 may be the same group as or different groups from each other.

Specific examples of the compound represented by General Formula (1) include pigments represented by Formula (8) to Formula (14).

(8)

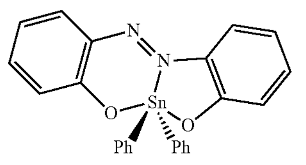

The pigment represented by Formula (8) is red and is a pigment that absorbs light with a wavelength of around 545 nm. In the formula, Ph represents a phenyl group.

(9)

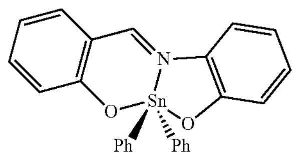

The pigment represented by Formula (9) is yellow and is a pigment that absorbs light with a wavelength of around 453 nm. In the formula, Ph represents a phenyl group.

(10)

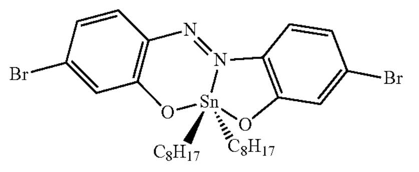

The pigment represented by Formula (10) is dark red violet.

(11)

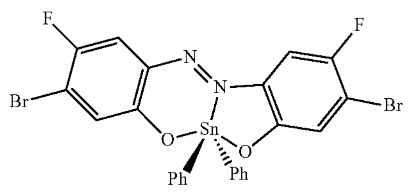

The pigment represented by Formula (11) is yellow. In the formula, Ph represents a phenyl group.

(12)

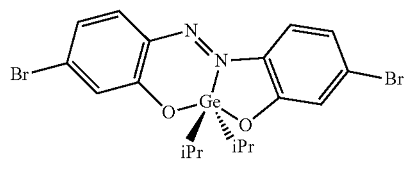

The pigment represented by Formula (12) is dark violet. In the formula, IPr represents an isopropyl group.

(13)

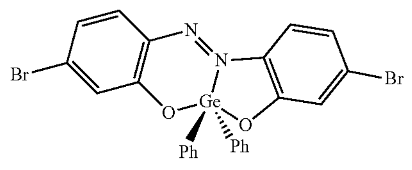

The pigment represented by Formula (13) is dark violet. In the formula, Ph represents a phenyl group.

Specific examples of the compound represented by Formula (2) include a pigment represented by Formula (14).

(14)

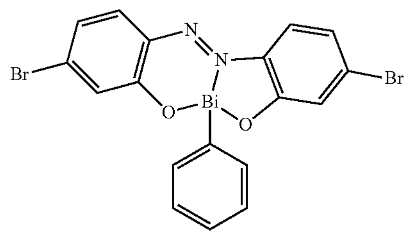

The pigment represented by Formula (14) is brown.

The pigment of the present embodiment is adsorbed to a metal hydroxyl group, while the pigment does not react with a hydroxyl group of water or a hydroxyl group of alcohol. Therefore, in a case where the pigment according to the present embodiment and a sample containing a metal hydroxyl group are brought into contact with each other, the above-described pigment is adsorbed to the metal hydroxyl group. Then, the color of the pigment is changed from the original color to a color on a short wavelength side.

A method for bringing the pigment into contact with the sample is not particularly limited. A dried sample and/or a dried pigment may be used, or other materials may be used. For example, the pigment and the sample may be directly mixed and brought into contact with each other. For example, the dried pigment and the dried sample may be mixed and brought into contact with each other. Alternatively, the sample may be added and brought into contact with a solution obtained by dissolving the pigment in an organic solvent. From the viewpoint of achieving uniform contact, it is preferable that the sample is added to a solution obtained by dissolving the pigment in the organic solvent, and the pigment and the sample are brought into contact with each other.

The metal hydroxyl group in the present embodiment is not particularly limited as long as the pigment of the present embodiment is adsorbed thereto, and Si—OH is also included in the examples thereof. The metal of the metal hydroxyl group may be a typical metal element, a transition metal element, a lanthanoid, or an actinoid.

The metal hydroxyl group in the present embodiment may be a hydroxyl group bonded to a metal atom, and metals bonded through the hydroxyl group may take any form. For example, a metal state may be adopted, or a state of a compound such as an oxide may be adopted.

The pigment of the present embodiment can react with a metal hydroxyl group on the surface of the metal oxide particle or a metal hydroxyl group contained in a silane coupling agent after hydrolysis.

In the pigment represented by General Formula (1), a penta-coordinated M in the formula, that is, the M having a coordination number of 5 is hexa-coordinated by reaction with a metal hydroxyl group. Changing the coordination number increases the electron density of M, and the R1 groups are positioned perpendicular to M, resulting in a decrease in the electron withdrawing property. Therefore, the LUMO energy level increases, and band gap widens. That is, the pigment having the penta-coordinated M in General Formula (1) reacts with a metal hydroxyl group, and M is thus hexa-coordinated, thereby a wavelength absorption peak shifting toward the short wavelength side. Therefore, in a case where the above-described pigment is adsorbed to the metal hydroxyl group, the red pigment changes to orange color, and the yellow pigment changes to green color. By utilizing such a change in color of the above-described pigment, the metal hydroxyl amount in the sample can be quantitatively evaluated.

In the pigment represented by General Formula (2), the metal corresponding to M in General Formula (1) is bismuth. As illustrated in FIG. 1, since bismuth belongs to Group 15 elements, the lone pair of electrons plays the same role as R1 in General Formula (1). Therefore, General Formula (1) and General Formula (2) as the complex structure form similar structures. That is, in the pigment represented by General Formula (2), a tetra-coordinate organic bismuth compound is penta-coordinated; thereby, the color of the pigment is changed. The mechanism of the color change is the same as that of the pigment represented by General Formula (1).

In addition, since the metal hydroxyl amount can be evaluated based on the color change, the pigment of the present embodiment can also be used to evaluate the approximate metal hydroxyl amount by visual observation.

The pigment of the present embodiment has high stability and is easy to handle, and it is possible to easily and accurately evaluate whether or not the sample contains a metal hydroxyl group and the amount of the contained metal hydroxyl group.

Since the pigment of the present embodiment has the above-described characteristics, it is possible to use the pigment in various applications.

For example, in the reaction in which the metal hydroxyl group in the pigment of the present embodiment is involved, the reacted metal hydroxyl amount can be quantitatively evaluated by evaluating the metal hydroxyl amount before and after the reaction.

Specifically, for example, in a case where metal oxide particles are surface-treated with a surface treatment agent, the metal hydroxyl amount of the metal oxide particles before and after the surface treatment can be evaluated with the pigment of the present embodiment to evaluate the degree of the surface treatment on the surface of the metal oxide particles.

In addition, in the reaction of hydrolysis of the silane coupling agent, the metal hydroxyl amount of the silane coupling agent before and after the reaction of hydrolysis can be evaluated with the pigment of the present embodiment to evaluate the degree of progression of the hydrolysis reaction of the silane coupling agent.

[Method for Producing Pigment]

Preferred examples of a method for producing a pigment will be described.

First Embodiment

A method for producing a pigment according to the present embodiment includes a mixing step of mixing a ligand represented by General Formula (4) or a ligand represented by General Formula (5) and a metal source represented by General Formula (6), and a coordinating step of coordinating the ligand represented by General Formula (4) or the ligand represented by General Formula (5) with the metal source represented by General Formula (6).

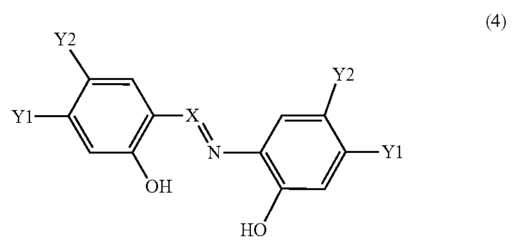
(4)

(In Formula (4), X is C or N, and Y1 and Y2 are each hydrogen, a halogen group, a methyl group, an alkoxy group, a phenyl group, a diphenylamide group, a thiophenyl group, or a phenylethynyl group)

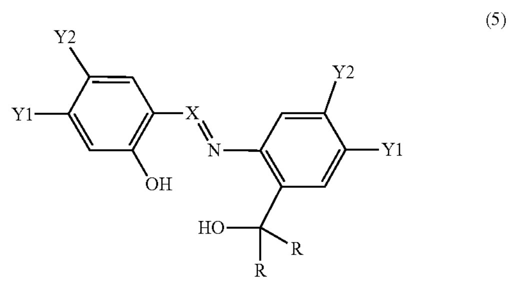
(5)

(In Formula (5), X is C or N, Y1 and Y2 are each hydrogen, a halogen group, a methyl group, an alkoxy group, a phenyl group, a diphenylamide group, a thiophenyl group, or a phenylethynyl group, and R is an alkyl group or a phenyl group)

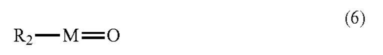
(6)

(In Formula (6), M is at least one selected from the group consisting of Sn, Ge, and Bi, and R is an alkyl group or a phenyl group)

Examples of Y1 and Y2 in Formula (4) or (5) may be the same as those of Y1 and Y2 in Formula (1) or (2). Examples of R's in Formula (5) may be the same as those for R2's in Formula (3). Examples of two R's in Formula (6) may be the same as those for R1's in Formula (1) and R2's in Formula (3).

Figure 2:
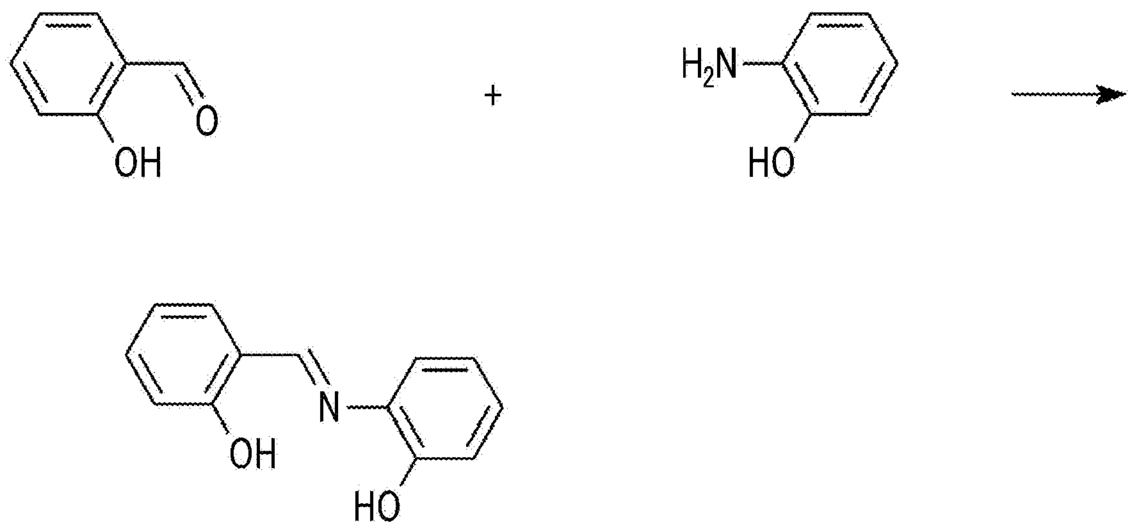
FIG. 2 is a diagram illustrating a synthesis example of a ligand represented by General Formula (4).
Figure 3:
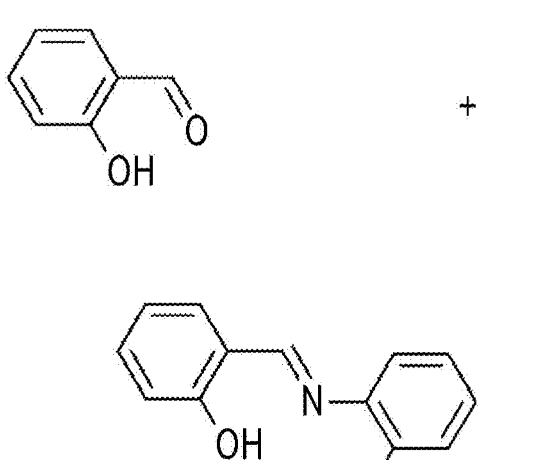
FIG. 3 is a diagram illustrating a synthesis example of a ligand represented by General Formula (5).

The ligand represented by General Formula (4) and the ligand represented by General Formula (5) can be synthesized through the condensation reaction of corresponding aldehydes with amines. A synthesis example of the ligand represented by General Formula (4) is illustrated in FIG. 2. A synthesis example of the ligand represented by General Formula (5) is illustrated in FIG. 3.

In the production method of the present embodiment, first, the ligand represented by General Formula (4) or the ligand represented by General Formula (5) and the metal source represented by General Formula (6) are prepared, and the prepared ligands and metal source are mixed with each other.

A method for causing the metal source to be coordinated with the ligand is not particularly limited. For example, the ligand and the metal source may be mixed and reacted with each other to be coordinated.

From the viewpoint of obtaining a uniform reactant, in the mixing step, it is preferable to perform a coordinating step of mixing the ligand, the metal source, and an organic solvent, for example, an organic solvent having 3 or more carbon atoms, and coordinating the metal source with the ligand in the mixed solution.

An example of a case where the ligand represented by General Formula (4) or the ligand represented by General Formula (5) and the metal source represented by General Formula (6) are reacted with each other will be described in detail.

The method for producing a pigment of the present embodiment includes a mixing step of charging a container with the ligand represented by General Formula (4) or the ligand represented by General Formula (5), the metal source represented by General Formula (6), and an organic solvent that is optionally used and has 3 or more carbon atoms and mixing these components to form a mixed solution, and a coordinating step of coordinating the ligand represented by General Formula (4) or the ligand represented by General Formula (5) with the metal source represented by General Formula (6) by a dehydration reaction.

In the mixing step, the above-described components can be mixed by a method optionally selected. The mixing step may be carried out at, for example, room temperature. The stirring may be performed by a method optionally selected.

After the mixing step, a step of replacing the atmosphere, for example, air in the container with another atmosphere may be performed. The other atmosphere may be, for example, a nitrogen atmosphere, an inert atmosphere, or a reduced pressure atmosphere. From the viewpoint of reaction efficiency, a nitrogen atmosphere or an inert atmosphere is preferable.

A method for carrying out the dehydration reaction is not particularly limited, and examples thereof include a method for heating the above-described mixed solution. In a case where the mixed solution contains an organic solvent having 3 or more carbon atoms, the mixed solution may be circulated. The dehydration reaction may be carried out while stirring.

In the present embodiment, in order to carry out the dehydration reaction, the organic solvent having 3 or more carbon atoms is not particularly limited as long as it can be mixed with water. From the viewpoint of removing the unreacted product by filtration, the organic solvent having 3 or more carbon atoms is more preferably an organic solvent in which the ligand and the metal source are not dissolved.

Examples of such an organic solvent include methanol, ethanol, 1-propanol, acetone, tetrahydrofuran, acetonitrile, and pyridine. Among these, from the viewpoint of easy handling, acetone is preferable.

The addition amount of the organic solvent in the mixed solution is not particularly limited as long as the ligands and the metal source can be uniformly mixed. For example, a content of the organic solvent in the mixed solution may be 0% by mass or more and 99% by mass or less, 10% by mass or more and 99% by mass or less, 30% by mass or more and 99% by mass or less, 50% by mass or more and 99% by mass or less, 70% by mass or more and 99% by mass or less, or 80% by mass or more and 99% by mass or less.

In order to carry out the dehydration reaction, the heating temperature for heating the above-described mixed solution is not particularly limited as long as the dehydration reaction proceeds, and may be, for example, 50° C. or higher and 100° C. or lower, or 60° C. or higher and 90° C. or lower.

The heating time for heating the above-described mixed solution is not particularly limited as long as the metal source is coordinated with the above-described ligand to produce the above-described pigment, and may be, for example, 1 hour or more and 24 hours or less, or 2 hours or more and 13 hours or less. Since it can be confirmed from the color of the reactant whether or not the pigment has been produced, the heating time may be adjusted while the color of the reactant is observed.

In a case where the above-described mixed solution is heated to carry out the dehydration reaction, the pigment of the present embodiment can be obtained by distilling the above-described organic solvent off from the mixed solution after the dehydration reaction. A method for distilling the organic solvent off is not particularly limited, and for example, drying the mixed solution may be employed.

From the viewpoint of removing unreacted products, the mixed solution after the dehydration reaction may be filtrated, and the organic solvent may be distilled off from the filtrate to obtain the pigment of the present embodiment.

The method for producing a pigment of the present embodiment may include a cleaning step after the dehydration reaction.

In a case where the organic solvent having 3 or more carbon atoms, which is used during the mixing of the ligand and the metal source, is desired to be removed by cleaning, as the organic solvent for cleaning, hexane, toluene, chloroform, or other solvents can be preferably used.

The organic solvent for cleaning and the obtained pigment are mixed to obtain a mixed solution, and the organic solvent is distilled off from the mixed solution to obtain a cleaned pigment.

The method for distilling the organic solvent off is not particularly limited as long as the organic solvent is removed, and for example, the organic solvent can be removed by heating and drying or vacuum drying.

In a case where it is desired to remove an unreacted product, the organic solvent for cleaning and the pigment obtained as described above can be mixed to obtain a mixed solution, followed by the filtration of the mixed solution to distill the organic solvent off from the filtrate, thereby removing the unreacted product.

Second Embodiment

A method for producing a pigment according to the present embodiment includes a mixing step of mixing the ligand represented by General Formula (4) or the ligand represented by General Formula (5), a metal source represented by General Formula (7), a base, and an organic solvent, and a coordinating step of coordinating the ligand represented by General Formula (4) or the ligand represented by General Formula (5) with the metal source represented by General Formula (7).

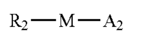

(7)

(In Formula (7), M is at least one selected from the group consisting of Sn, Ge, and Bi, R is an alkyl group or a phenyl group, and A is a halogen group)

Examples of two R's in Formula (7) may be the same as those for R1's in Formula (1) and R2's in Formula (3).

In the production method of the present embodiment, first, the ligand represented by General Formula (4) or the ligand represented by General Formula (5) and the metal source represented by General Formula (7) are prepared, and the prepared ligand and metal source are mixed with each other.

An example of a case where the ligand represented by General Formula (4) or the ligand represented by General Formula (5) and the metal source represented by General Formula (7) are reacted with each other will be described in detail.

The method for producing a pigment of the present embodiment includes a mixing step of charging a container with the ligand represented by General Formula (4) or the ligand represented by General Formula (5), the metal source represented by General Formula (7), a base, and an organic solvent and mixing these components to form a mixed solution, and a coordinating step of coordinating the ligand represented by General Formula (4) or the ligand represented by General Formula (5) with the metal source represented by General Formula (7) by a deacidification reaction.

In the mixing step, the above-described components can be mixed by a method optionally selected in the same manner as in the second embodiment.

After the mixing step, a step of replacing the atmosphere, for example, air in the container with another atmosphere may be performed. The other atmosphere may be, for example, a nitrogen atmosphere, an inert atmosphere, or a reduced pressure atmosphere. From the viewpoint of reaction efficiency, a nitrogen atmosphere or an inert atmosphere is preferable.

The method for carrying out the deacidification reaction is not particularly limited as long as the base can trap an acid. The deacidification reaction may be carried out while stirring. For example, the mixed solution may be stirred at room temperature. The base may be used in an amount necessary for promoting the deacidification reaction. Therefore, for example, the base may be mixed such that the amount thereof is 2 or more and 20 or less times the molar amount of the metal source.

The base is not particularly limited as long as it can trap an acid, but a tertiary amine is preferably used, and a tertiary alkylamine is more preferably used.

As the base, for example, trimethylamine, triethylamine, diisopropylethylamine, tributylamine, trioctylamine, diazabicycloundecene, diazabicyclononene, pyridine, or other bases can be used. Among these, triethylamine, which is easy to handle, is preferable.

The organic solvent is not particularly limited as long as it does not reduce the deacidification reaction and does not dissolve a salt of a by-product. As such an organic solvent, for example, tetrahydrofuran can be preferably used.

The addition amount of the organic solvent is not particularly limited as long as the ligands, the metal source, and the base can be uniformly mixed. For example, a content of the organic solvent in the mixed solution may be 1% by mass or more and 99% by mass or less, 10% by mass or more and 99% by mass or less, 30% by mass or more and 99% by mass or less, 50% by mass or more and 99% by mass or less, 70% by mass or more and 99% by mass or less, or 80% by mass or more and 99% by mass or less.

The stirring time in the deacidification step is not particularly limited as long as the pigment is produced, and may be, for example, 1 hour or more and 24 hours or less, or 2 hours or more and 13 hours or less. Since it can be confirmed from the color of the reactant whether or not the pigment has been produced, the stirring time may be adjusted while the color of the reactant is observed.

The method for producing a pigment of the present embodiment preferably includes a step of removing a salt of a by-product after the deacidification reaction. A method for removing the salt is not particularly limited, and examples thereof include a filtration method.

The pigment of the present embodiment can be obtained by distilling the organic solvent off from the mixed solution after the deacidification reaction or from the filtrate obtained by filtration of the mixed solution after the deacidification reaction.

In order to increase the purity of the pigment, the method for producing a pigment of the present embodiment may include a step of isolating the pigment or a recrystallization step after the salt of the by-product is removed.

According to the method for producing a pigment of the present embodiment, the pigment of the above-described embodiment can be obtained by the above-described steps.

Solution

The solution of the present embodiment contains the pigment and organic solvent of the above-described embodiment.

Since the above-described pigment is dissolved in the solution of the present embodiment, the solution is colored with the same color as the pigment color in a case where the organic solvent is colorless and transparent.

The organic solvent is not particularly limited as long as the above-described pigment can be dissolved in the organic solvent, and examples of the organic solvent include methanol, ethanol, propanol, butanol, pentanol, hexanol, toluene, tetrahydrofuran, xylene, hexane, chloroform, benzene, methyl ethyl ketone, methyl isobutyl ketone, acetone, propylene glycol monomethyl ether, ethyl acetate, butyl acetate, and other solvents. In addition, from the viewpoint of concentration stability of the solution, the boiling point of the organic solvent is preferably high. In the solution of the present embodiment, an organic solvent in which the pigment is easily dissolved may be appropriately selected and used.

The concentration of the above-described pigment contained in the solution of the present embodiment is not particularly limited as long as the number of moles of the pigment is greater than the number of moles of the metal hydroxyl group contained in the sample for evaluation.

In a case where it is desired to quantitatively evaluate the metal hydroxyl amount, the amount of the pigment of the present embodiment may be sufficiently increased within a range in which the pigment is dissolved. In a case where it is desired to simply and qualitatively evaluate the adsorption of the metal hydroxyl group by visual observation, the concentration of the above-described pigment may be adjusted to a concentration at which the color change is easily recognized.

The concentration of the above-described pigment contained in the solution of the present embodiment may be, for example, $1\times10^{-10}$ mol/L or more and 1 mol/L or less.

In a case where it is desired to evaluate the metal hydroxyl amount of the surface of the metal oxide particles, a concentration of the pigment contained in the solution of the present embodiment is preferably $1\times10^{-3}$ mol/L or more and $1\times10^{-7}$ mol/L or less, more preferably $1\times10^{-4}$ mol/L or more and $1\times10^{-6}$ mol/L or less.

The solution of the present embodiment may be composed of only the above-described pigment and the above-described organic solvent, but within a range not impairing the effects of the present invention, the solution may contain other components in addition to the above-described pigment and the above-described organic solvent.

The above-described pigment contained in the solution of the present embodiment is selectively adsorbed to the metal hydroxyl group contained in the sample and does not react with a hydroxyl group such as water or alcohol. Therefore, the amount of the metal hydroxyl group contained in the sample can be qualitatively and quantitatively evaluated without being affected by moisture. Furthermore, since the pigment of the present embodiment does not react with a hydroxyl group such as water or alcohol, the solution of the present embodiment has excellent stability even in the atmosphere and is easy to store.

In a case where a sample for evaluation is added to the solution of the present embodiment, the sample may precipitate in the solution or may not precipitate in the solution.

In a case where, when the sample for evaluation is added to the solution of the present embodiment, the sample precipitates in the solution, the amount of the pigment contained in the solution is reduced by adsorption to the precipitated sample. Therefore, the color of the solution becomes lighter. The color of the pigment adsorbed to the sample is changed from the original color to a color on the short wavelength side.

Therefore, in order to evaluate the amount of metal hydroxyl group contained in the sample, the evaluation may be performed based on a color of the pigment before and after adsorption to the sample or a color of the solution before and after the addition of the sample. Both evaluations may be performed.

In a case where, when the sample for evaluation is added to the solution of the present embodiment, the sample is uniformly mixed without precipitating in the solution, a color of the pigment dissolved in the solution changes. As a result, the color of the solution changes to a color on the short wavelength side.

Therefore, in order to evaluate the amount of the metal hydroxyl group contained in the sample, the evaluation may be performed based on the color of the solution before and after the addition of the sample. The evaluation can be performed by any method, and for example, as described later, a visual observation or a measurement using a device may be performed, a difference may be inferred from the observed results, or an arithmetic calculation using these results may be performed as necessary.

[Metal Hydroxyl Amount Evaluation Method]

Preferred examples of a metal hydroxyl amount evaluation method will be described.

First Embodiment

A metal hydroxyl amount evaluation method of the present embodiment includes a step of evaluating a color x of the solution, a step of adding the sample to the solution to prepare a mixed solution A and evaluating a color a of the mixed solution A, and a step of evaluating a difference between the color x and the color a and evaluating a metal hydroxyl amount of the sample.

The above-described color x and the above-described color a may be evaluated by visual observation or by the measurement of physical quantities related to the colors, such as an absorbance. Specifically, examples thereof include calculation of the metal hydroxyl amount using an absorbance.

In the present invention, the sample may be any sample as long as it can be evaluated. For example, the sample may be a sample consisting of powder or particles, and the metal hydroxyl amount of the surface of the powder or the surface of the particles may be evaluated. The sample may be a solid or a non-solid, or may be a liquid sample or a flowable sample, as necessary. In addition, in the present invention, the evaluating may mean measuring, observing, comparing, calculating, or the like.

An example of a method for accurately evaluating the metal hydroxyl amount a on the surface of the sample by an absorbance will be described. In order to simplify the description, an evaluation method using metal oxide particles as a sample and using a pigment as the pigment represented by General Formula (8), which is a red pigment absorbing light having a wavelength of 545 nm, will be described.

In addition, the amount of the pigment in the solution is n (mol), and the amount of the metal oxide particles added to the solution is h (g). In addition, a specific surface area of the metal oxide particles is represented by S ($m^2/g$).

An absorbance meter is used to measure an absorbance of the solution at a wavelength of 545 nm, and a value of the absorbance is defined as x (color x).

Metal oxide particles are added to the solution and mixed with each other to obtain a mixed solution A. From the viewpoint of enhancing the reaction between the pigment and the metal hydroxyl group, it is preferable to carry out heating and mixing. The heating temperature is preferably a temperature at which the organic solvent in the solution does not volatilize, and the mixing is preferably carried out at, for example, 40° C. or higher and 70° C. or lower. The heating temperature may be adjusted to be lower than the boiling point of the organic solvent.

The mixing time is not particularly limited as long as the color change of the solution disappears, and for example, the mixing may be carried out for 1 hour or more and 12 hours or less.

The addition amount of the metal oxide particles to the solution is not particularly limited as long as the addition amount is an amount at which the color change of the solution is easily recognized. For example, a sample of 1 mg or more and 10 mg or less may be added to the solution of 3 mL or more and 10 mL or less with a concentration of the pigment of $1\times10^{-3}$ mol/L or more and $1\times10^{-7}$ mol/L or less.

In a case where the evaluation is performed based on the color of the solution, and the metal oxide particles precipitate in the mixed solution A, it is preferable to remove the metal oxide particles to which the pigment is adsorbed from the mixed solution A by centrifugal separation, filtration, or other methods, followed by evaluating the absorbance of the mixed solution A.

An absorbance meter is used to measure an absorbance of the mixed solution A at a wavelength of 545 nm, and the value of the absorbance is defined as a (color a).

An example of a method for evaluating (by visual comparison, calculation, or other methods) the metal hydroxyl amount a of the sample on the basis of the difference between the color x and the color a will be specifically described below. The metal hydroxyl amount a can be preferably evaluated by visual observation, an absorbance a1, a reduction proportion a2, an adsorption amount a3 (mol/g), an adsorption amount a4 (mol/$m^2$), an adsorption amount a4' (pieces/$m^2$), a value a5 (pieces/g or pieces/$m^2$), or the like described below.

(Calculation 1 Using Evaluation Result)

An absorbance of the mixed solution A at a wavelength of 545 nm is measured, and the value of the absorbance is defined as a (a1).

The reduction proportion a2 of the absorbance is calculated by Equation (21).

$$\text{Reduction proportion } a2 \text{ of absorbance of mixed solution } A = (x - a1)/x \tag{21}$$

Since the reduction in the absorbance is a result of the reaction between the metal hydroxyl group and the pigment, the reduction proportion a2 of the absorbance can be regarded as the adsorption proportion of the pigment to the metal oxide particles.

(Calculation 2 Using Evaluation Result)

The adsorption amount a3 (mol/g) of the pigment per gram of the metal oxide particles can be calculated by Equation (22).

$$\text{Adsorption amount } a3 \text{ (mol/g) of pigment per gram of metal oxide particles} = \text{adsorption proportion of pigment to metal oxide particles} \times \text{amount (mol) of pigment/mass (g) of metal oxide particles} = a2 \times n \text{ (mol)/h (g)} \tag{22}$$

Since the pigment and the metal hydroxyl group react with each other at a molar ratio of 1:1, the value calculated from Equation (22) indicates the amount of the metal hydroxyl group contained per gram of the metal oxide particles.

(Calculation 3 Using Evaluation Result)

In a case where it is desired to exclude the influence of the size of the metal oxide particles, the adsorption amount a3 of the pigment may be divided by a specific surface area S of the metal oxide particles. That is, the adsorption amount a4 (mol/$m^2$) of the pigment per square meter of the metal oxide particles can be calculated by Equation (23). The adsorption amount a4 of the pigment per square meter of the metal oxide particles indicates the amount of the metal hydroxyl group contained per square meter of the metal oxide particles.

$$\text{Adsorption amount } a4 \text{ of pigment (mol/m}^2\text{) per square meter of metal oxide particles} = a3\text{(mol/g)}/S\text{(m}^2\text{/g)} \tag{23}$$

In addition, optionally, the metal hydroxyl amount (pieces/g), which is obtained by the following calculation 4 and converted into the number of metal hydroxyl groups may be divided by the specific surface area S of the metal oxide particles by using the result of the calculation 2 to obtain the adsorption amount (pieces/$m^2$).

(Calculation 4 Using Evaluation Result)

In a case where it is desired to determine the metal hydroxyl amount in terms of the number of metal hydroxyl groups, not in terms of moles, the value a5 (pieces/g or pieces/$m^2$) may be obtained by multiplying a value obtained as the calculation result of Equation (22) or Equation (23) by the Avogadro constant ($6.02 \times 10^{23}$ pieces/mol).

In a case where both the calculation 3 and calculation 4 are performed, any of the calculations may be performed first.

According to the metal hydroxyl amount evaluation method of the present embodiment, the amount of the pigment adsorbed to the sample can be obtained from the amount of the change in color of the solution. Therefore, the amount of the metal hydroxyl group contained in the sample can be qualitatively and quantitatively evaluated.

Second Embodiment

A metal hydroxyl amount evaluation method of the present embodiment includes a step of adding the sample 1 to the solution to prepare a mixed solution A and evaluating a color a of the mixed solution A; a step of adding the sample 2 to the solution to prepare a mixed solution B and evaluating a color b of the mixed solution B; and a step of evaluating a difference between the color a and the obtained color b and evaluating a difference between a metal hydroxyl amount of the sample 1 and a metal hydroxyl amount of the sample 2.

In order to evaluate the difference, comparisons by visual observation, measurement, calculation of a measurement result, or other methods may be performed.

In the same manner as in the first embodiment, it is assumed that the samples (sample 1 and sample 2) are used as metal oxide particles, and the pigment represented by General Formula (8) is used as a pigment. The sample 1 and the sample 2 can be optionally selected as necessary. For example, at least one of materials, compositions, characteristics, production conditions, treatment conditions, physical properties, sizes, shapes, and/or storage conditions or the like of the sample 1 and sample 2 may be the same or different from each other. These may be unknown at the time of measurement. The sample 1 and the sample 2 may be samples having the same type or different types from each other, but are preferably samples having the same type.

In the same manner as in the first embodiment, metal oxide particles serving as the sample 1 are added to the solution and mixed with each other to obtain a mixed solution A. In addition, in the same manner as in the first embodiment, metal oxide particles serving as the sample 2 are added to the solution and mixed with each other to obtain a mixed solution B.

An absorbance meter is used to measure an absorbance of the mixed solution A at a wavelength of 545 nm, and the value of the absorbance is defined as a (color a). In addition, an absorbance meter is used to measure an absorbance of the mixed solution B at a wavelength of 545 nm, and the value of the absorbance is defined as b (color b).

By evaluating the difference between the color a and the color b, for example, comparing these values, the difference between the metal hydroxyl amount a of the sample 1 and the metal hydroxyl amount b of the sample 2 is evaluated, that is, the presence or absence and the degree of the difference are determined. The metal hydroxyl amount evaluation method of the present embodiment is merely to measure the color a and the color b. Therefore, the difference between the metal hydroxyl amount a of the sample 1 and the metal hydroxyl amount b of the sample 2 can be easily and qualitatively evaluated by, for example, visual observation.

Third Embodiment

A metal hydroxyl amount evaluation method of the present embodiment includes a step of evaluating a color x of the solution, a step of adding the sample 1 to the solution to prepare a mixed solution A and evaluating a color a1 of the mixed solution A, a step of adding the sample 2 to the solution to prepare a mixed solution B and evaluating a color b1 of the mixed solution B, a step of evaluating a difference between the color x and the color a1 obtained, and evaluating a metal hydroxyl amount a (a2) of the sample 1, a step of evaluating a difference between the color x and the color b1 obtained, and evaluating a metal hydroxyl amount b (b2) of the sample 2, and a step of evaluating a difference between the metal hydroxyl amount a (a2) and the metal hydroxyl amount b (b2).

In the same manner as in the first embodiment, it is assumed that the samples (sample 1 and sample 2) are used as metal oxide particles, and the pigment represented by General Formula (8) is used as a pigment. Examples of the sample 1 and the sample 2 may be the same as those in the first and second embodiments. In order to evaluate the difference, comparisons by visual observation, measurement, calculation of a measurement result, or other methods may also be performed.

In the same manner as in the first embodiment, metal oxide particles serving as the sample 1 are added to the solution and mixed with each other to obtain a mixed solution A. In addition, in the same manner as in the first embodiment, metal oxide particles serving as the sample 2 are added to the solution and mixed with each other to obtain a mixed solution B.

In the present embodiment, in the same manner as in the first embodiment, by evaluating the difference between the color x and the color a1 to obtain the metal hydroxyl amount a (a2) of the sample 1, the amount of the pigment adsorbed to the sample 1, that is, the amount of the hydroxyl group contained in the metal oxide particles of the sample 1 can be obtained. In addition, in the same manner as in the first embodiment, by evaluating the difference between the color x and the color b1 to obtain the metal hydroxyl amount b (b2) of the sample 2, the amount of the pigment adsorbed to the sample 2, that is, the amount of the hydroxyl group contained in the metal oxide particles of the sample 2 can be obtained. In the present embodiment, the calculations 1 to 4 and other methods described in the first embodiment can also be preferably used. Therefore, the amount of the metal hydroxyl group contained in the sample 1 and the sample 2 can be qualitatively and quantitatively evaluated. That is, the difference between the metal hydroxyl amount a (a2) of the sample 1 and the metal hydroxyl amount b (b2) of the sample 2 can be evaluated.

[Metal Hydroxyl Treatment Proportion Evaluation Method]

A metal hydroxyl treatment proportion evaluation method of the present embodiment is a method for evaluating the treatment proportion of the metal hydroxyl group on the surface of a metal oxide particle in a case where the metal oxide particle is surface-treated with a surface treatment agent. In the evaluation method of the present embodiment, the calculations described in the first embodiment can also be preferably used. The evaluation method of the present embodiment includes a step of measuring an absorbance x of the solution, a step of adding the metal oxide particle 1 before the surface treatment to the solution to prepare a mixed solution A and measuring an absorbance a1 of the mixed solution A, a step of adding the metal oxide particle 2 after the surface treatment to the solution to prepare a mixed solution B and measuring an absorbance b1 of the mixed solution B, a step of calculating a reduction proportion a2 of the absorbance of the mixed solution A by subtracting the absorbance a1 from the absorbance x to obtain a value and dividing the obtained value by the absorbance x ($(x-a1)/x$), a step of calculating a reduction proportion b2 of the absorbance of the mixed solution B by subtracting the absorbance b1 from the absorbance x to obtain a value and dividing the obtained value by the absorbance x ($(x-b1)/x$), a step of calculating an adsorption amount a3 (mol/g) of the pigment to the metal oxide particle 1 by multiplying the reduction proportion a2 of the absorbance by the number of moles of a pigment contained in the mixed solution A to obtain a value and dividing the obtained value by an addition amount of the metal oxide particle 1 to the solution A (a2×the number of moles of the pigment contained in the mixed solution A/the addition amount of the metal oxide particle 1 to the solution A), a step of calculating an adsorption amount b3 (mol/g) of the pigment to the metal oxide particle 2 by multiplying the reduction proportion b2 of the absorbance by the number of moles of the pigment contained in the mixed solution B to obtain a value and dividing the obtained value by an addition amount of the metal oxide particle 2 to the solution B (b2×the number of moles of the pigment contained in the mixed solution B/the addition amount of the metal oxide particle 2 to the solution B), and a step of calculating a metal hydroxyl treatment proportion obtained as a result of the surface treatment by dividing the adsorption amount b3 by the adsorption amount a3 to obtain a value, multiplying the obtained value by 100 to obtain a value, and subtracting the obtained value from 100 ($100-(b3/a3\times100)$).

The metal hydroxyl treatment proportion evaluation method of the present embodiment will be described in detail.

Metal oxide particles 1 (sample 1) before the surface treatment are prepared. In addition, metal oxide particles 2 (sample 2) obtained by performing a surface treatment on the metal oxide particles 1 with a silane coupling agent or other treatment agents are prepared. The solution is also prepared.

The metal oxide particles 1 are added to the solution and stirred and mixed to prepare a mixed solution A1. The metal oxide particles 1 are removed from the mixed solution A1 by centrifugal separation to obtain a mixed solution A2 for evaluation.

In addition, the metal oxide particles 2 are added to the solution and stirred and mixed to prepare a mixed solution B1. The metal oxide particles 2 are removed from the mixed solution B1 by centrifugal separation to obtain a mixed solution B2 for evaluation.

An absorbance of each of the solution, the mixed solution A2, and the mixed solution B2 are measured at a wavelength of 545 nm.

A reduction proportion in the absorbance of each of the mixed solution A2 and the mixed solution B2 is calculated by the following equation (corresponding to the calculation 1).

Reduction proportion a2 of absorbance of mixed solution A2=adsorption proportion of pigment to metal oxide particles 1 contained in mixed solution A2=(absorbance of the above-described solution−absorbance of mixed solution A2)/absorbance of the above-described solution Reduction proportion b2 of absorbance of mixed solution B2=adsorption proportion of pigment to metal oxide particles 2 contained in mixed solution B2=(absorbance of the above-described solution−absorbance of mixed solution B2)/absorbance of the above-described solution Since the reduction of the absorbance of the red pigment at a wavelength of 545 nm means that the pigment is being adsorbed, it can be converted into the reduction proportion of the absorbance=the adsorption proportion of the pigment.

The adsorption amount a3 (mol/g) of the pigment per gram of the particles contained in the mixed solution A and the adsorption amount b3 (mol/g) of the pigment per gram of the particles contained in the mixed solution B are calculated by the following equation (corresponding to the calculation 2).

Adsorption amount a3 (mol/g) of pigment to metal oxide particles 1=adsorption proportion of pigment to metal oxide particles 1 (reduction proportion a2 of the above-described absorbance)×amount (mol) of pigment/mass (g) of metal oxide particles 1

Adsorption amount b3 (mol/g) of pigment to metal oxide particles 2=adsorption proportion of pigment to metal oxide particles 2 (reduction proportion b2 of the above-described absorbance)×amount (mol) of pigment/mass (g) of metal oxide particles 2

Next, as illustrated in the following equation, the adsorption amount (mol/g) of the pigment may be multiplied by the Avogadro constant ($6.02\times10^{23}$ pieces/mol) to be converted into the adsorption amount (pieces/g) of the pigment (corresponding to the calculation 4).

Adsorption amount of pigment (pieces/g) of metal oxide particles 1=adsorption amount of pigment (mol/g) of metal oxide particles 1×Avogadro constant Adsorption amount of pigment (pieces/g) of metal oxide particles 2=adsorption amount of pigment (mol/g) of metal oxide particles 2×Avogadro constant The pigment of the present embodiment reacts with a metal hydroxyl group present on the surface of the metal oxide particles at a one-to-one ratio. Therefore, the adsorption amount (pieces/g) of the pigment means the amount (pieces/g) of the metal hydroxyl group present on the surface of the metal oxide particles 1 or the metal oxide particles 2, that is, the amount (pieces/g) of the untreated metal hydroxyl group without surface treatment.

Therefore, the amount (pieces/g) of the untreated metal hydroxyl group of the metal oxide particles 1 is equal to the adsorption amount (pieces/g) of the pigment to the metal oxide particles 1.

In addition, the amount (pieces/g) of the untreated metal hydroxyl group of the metal oxide particles 2=the adsorption amount (pieces/g) of the pigment to the metal oxide particles 2.

Next, as illustrated in the following equation, the amount (pieces/g) of the untreated metal hydroxyl group may be divided by the specific surface area of the metal oxide particles to calculate the amount (pieces/$m^2$) of the untreated metal hydroxyl group per unit area of the metal oxide particles (corresponding to the calculation 3).

Amount of untreated metal hydroxyl group (pieces/$m^2$) per unit area of metal oxide particles 1=amount of untreated metal hydroxyl group (pieces/g) of metal oxide particles 1/specific surface area ($m^2$/g) of metal oxide particles 1.

Amount of untreated metal hydroxyl group (pieces/$m^2$) per unit area of metal oxide particles 2=amount of untreated metal hydroxyl group (pieces/g) of metal oxide particles 2/specific surface area ($m^2$/g) of metal oxide particles 2 before surface treatment.

After the amounts of the untreated metal hydroxyl group of the metal oxide particles 1 and 2 are obtained, the treatment proportion of the metal hydroxyl group present on the surface of the metal oxide particles is calculated by the following calculation (corresponding to the calculation 5).

$$\text{Treatment proportion (\%) of metal hydroxyl group of metal oxide particles 1} = 100-\left(\text{amount }\left(\text{pieces/m}^2\right)\text{ of untreated metal hydroxyl group of metal oxide particles 1/amount }\left(\text{pieces/m}^2\right)\text{ of untreated metal hydroxyl group of metal oxide particles }1\times100\right)$$

$$\text{Treatment proportion (\%) of metal hydroxyl group of metal oxide particles 2} = 100-\left(\text{amount }\left(\text{pieces/m}^2\right)\text{ of untreated metal hydroxyl group of metal oxide particles 2/amount }\left(\text{pieces/m}^2\right)\text{ of untreated metal hydroxyl group of metal oxide particles }1\times100\right)$$

The larger the metal hydroxyl treatment proportion, the more the metal hydroxyl group present on the surface of the metal oxide particles is surface-treated and becomes hydrophobic.

In a case where the metal oxide particles are surface-treated with the surface treatment agent, the amount of the untreated metal hydroxyl group of the metal oxide particles before the surface treatment is first calculated and set as a reference value. Next, the amount of the untreated metal hydroxyl group of the metal oxide particles after the surface treatment is calculated to obtain a value, and the value is divided by the reference value and multiplied by 100, and in this way, the proportion (%) of the amount of the metal hydroxyl group remaining on the surface of the metal oxide particles can be calculated. Accordingly, the proportion (%) of the remaining hydroxyl group can be subtracted from 100 to calculate the treatment proportion of the metal hydroxyl group before and after the surface treatment, that is, whether or not the metal hydroxyl group present on the surface of the metal oxide particles before the surface treatment is treated.

Therefore, it is also possible to evaluate the residual proportion of the metal hydroxyl groups on the surface of the metal oxide particles by the amount of the untreated metal hydroxyl group of the metal oxide particles 2 that has been surface-treated/the amount of the untreated metal hydroxyl group of the metal oxide particles 1 before the surface treatment×100.

Since the metal hydroxyl amount of the metal oxide particles before the surface treatment is in a state in which the total amount of the untreated metal hydroxyl groups remain, the metal hydroxyl treatment proportion (%) is 0. On the other hand, in a case where all of the metal hydroxyl groups present on the surface of the metal oxide particles are surface-treated, the metal hydroxyl treatment proportion (%) is 100.

The amount of the untreated metal hydroxyl group is exemplified by the value of the calculation 3 described above, but may be performed with any of the units of the calculations 2, 3, and 4.

According to the metal hydroxyl treatment proportion evaluation method of the present embodiment, it is possible to quantitatively evaluate the surface treatment degree of the metal hydroxyl groups on the surface of the metal oxide particles with the surface treatment agent.

EXAMPLES

Hereinafter, the present invention will be described more specifically with reference to Examples and Comparative Examples, but the present invention is not limited to the following Examples.

Example 1

"Preparation of Red Pigment"

1 mmol of 2,2'-dihydroxyazobenzene as a ligand, 1 mmol of diphenyltin (IV) oxide as a metal source, and 30 mL of acetone were mixed with each other to prepare a mixed solution.

Next, the mixed solution was stirred at 70° C. for 3 hours to carry out a dehydration reaction, and the metal source was coordinated with the ligand.

Figure 4:
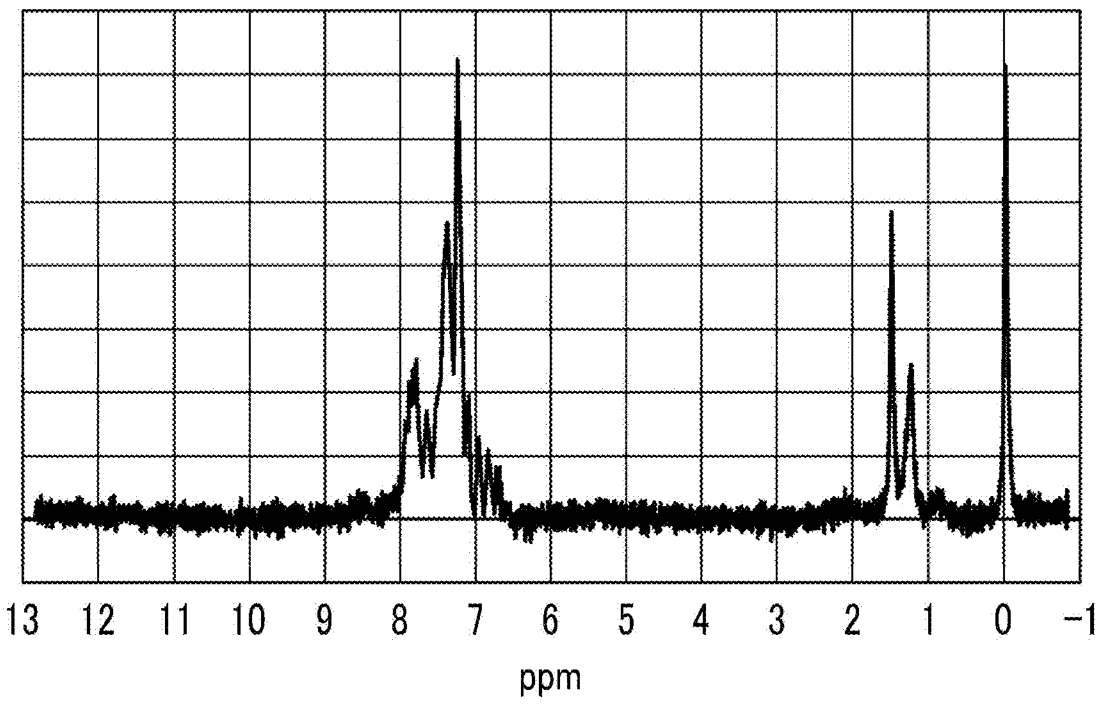
FIG. 4 is a diagram illustrating the measurement results of 1H-NMR of the pigment obtained in Example 1.

The mixed solution after the dehydration reaction was filtrated, the filtrate was collected, and the solvent was distilled off from the filtrate, thereby obtaining the pigment of Example 1 represented by Formula (8). As a result of visually observing the color of the obtained pigment, the color of the pigment was red. The measurement result of $^1$H-NMR of the obtained pigment is illustrated in FIG. 4.

The obtained red pigment of Example 1 and water were mixed with each other, but the color of the red pigment was not changed. Accordingly, it was confirmed that the red pigment of Example 1 does not react with a hydroxyl group of water.

The obtained red pigment of Example 1 and ethanol were mixed with each other, but the color of the red pigment was not changed. Accordingly, it was confirmed that the red pigment of Example 1 does not react with a hydroxyl group of alcohol.

Figure 5:
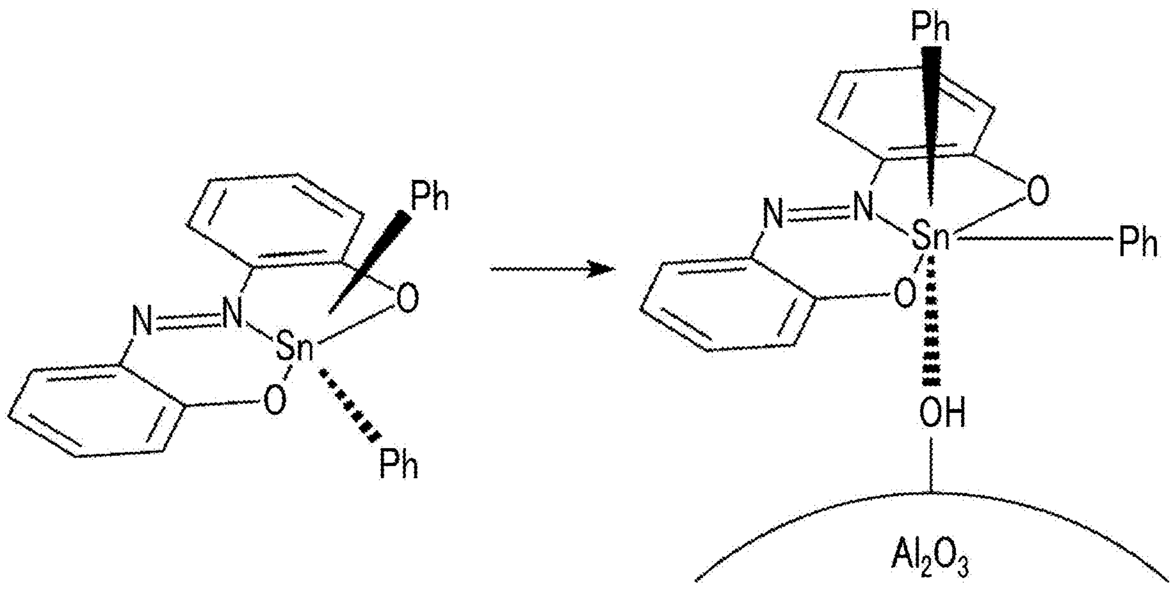
FIG. 5 is a schematic diagram illustrating a reaction mechanism between the red pigment of Example 1 and a metal hydroxyl group present on the surface of an active alumina particle.

The red pigment of Example 1 was added to commercially available active alumina particles, resulting in the occurrence of change in the red pigment to yellow. It is considered that the color change occurred by the reaction between the red pigment of Example 1 and the hydroxyl group present on the surface of the active alumina particles to cause Sn of the red pigment of Example 1 to be changed from a penta-coordinated state to a hexa-coordinated state. FIG. 5 illustrates a reaction mechanism between the red pigment of Example 1 and the hydroxyl group present on the surface of the active alumina particle.

From these evaluation results, it was confirmed that the red pigment of Example 1 was not adsorbed to the hydroxyl group of water or alcohol, and was selectively adsorbed to the metal hydroxyl group.

Example 2

"Preparation of Yellow Pigment"

The pigment of Example 2 represented by Formula (9) was obtained in the same manner as in Example 1, except that σ-salicylidenaminophenol was used instead of 2,2'-dihydroxyazobenzene. As a result of visually observing the color of the obtained pigment, the color of the pigment was dark yellow.

The obtained yellow pigment of Example 2 and water were mixed with each other, but the color of the yellow pigment was not changed. Accordingly, it was confirmed that the yellow pigment of Example 2 does not react with a hydroxyl group of water.

The obtained yellow pigment of Example 2 and ethanol were mixed with each other, but the color of the yellow pigment was not changed. Accordingly, it was confirmed that the yellow pigment of Example 2 does not react with a hydroxyl group of alcohol.

Figure 6:
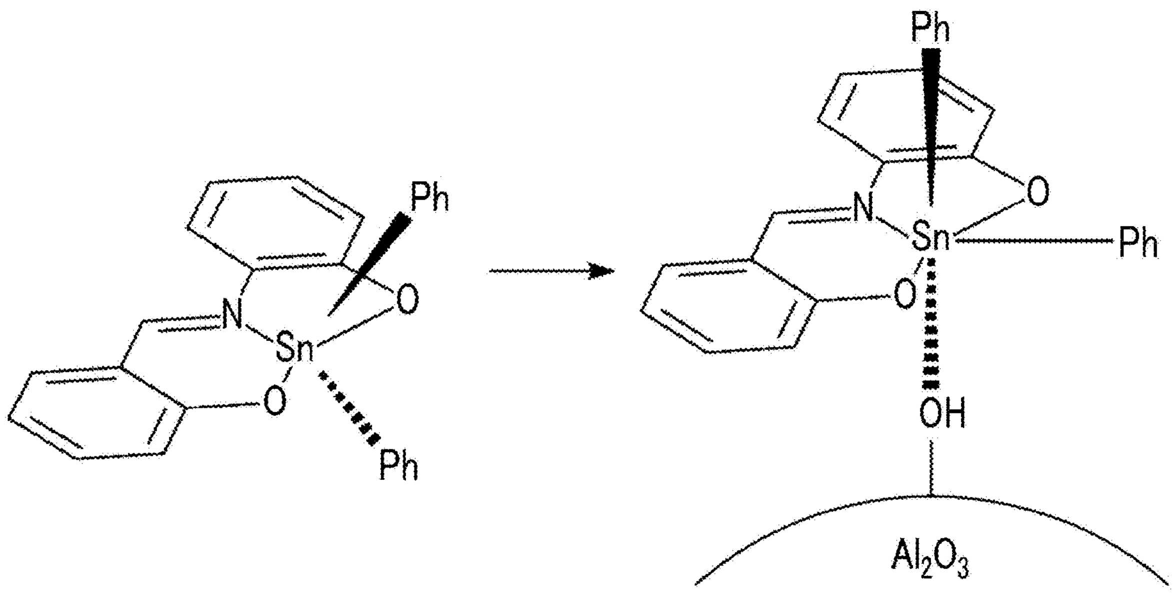
FIG. 6 is a schematic diagram illustrating a reaction mechanism between the yellow pigment of Example 2 and a metal hydroxyl group present on the surface of an active alumina particle.

As a result of adding the yellow pigment of Example 2 to commercially available active alumina particles, it was confirmed that the color of the yellow pigment was changed to light yellow. It is considered that the color change occurred by the reaction between the yellow pigment of Example 2 and the hydroxyl group present on the surface of the active alumina particles to cause Sn of the yellow pigment of Example 2 to be changed from a penta-coordinated state to a hexa-coordinated state. FIG. 6 illustrates a reaction mechanism between the yellow pigment of Example 2 and the hydroxyl group present on the surface of the active alumina particle.

From these evaluation results, it was confirmed that the yellow pigment of Example 2 was not adsorbed to the hydroxyl group of water or alcohol, and was selectively adsorbed to the metal hydroxyl group.

Example 3

The pigment of Example 3 represented by Formula (10) was obtained in the same manner as in Example 1, except that 4,4'-dibromo-2,2'-dihydroxyazobenzene and dioctyltin (IV) oxide were used instead of 2,2'-dihydroxyazobenzene and diphenyltin (IV) oxide. As a result of visually observing the color of the obtained pigment, the color of the pigment was dark red violet.

Example 4

"Preparation of Yellow Pigment"

The pigment of Example 4 represented by Formula (11) was obtained in the same manner as in Example 1, except that 4,4'-dibromo-3,3'-difluoro-2,2'-dihydroxyazobenzene was used instead of 2,2'-dihydroxyazobenzene. As a result of visually observing the color of the obtained pigment, the color of the pigment was dark yellow.

Example 5

"Preparation of Dark Violet Pigment"

1 mmol of 4,4'-dibromo-2,2'-dihydroxyazobenzene as a ligand, 1 mmol of dichlorodiisopropylgermanium as a metal source, 4 mL of tetrahydrofuran, and 0.3 mL of triethylamine were mixed to prepare a mixed solution.

Next, the mixed solution was stirred for 6 hours at room temperature to carry out a deacidification reaction, and the metal source was coordinated with the ligand.

Next, a salt of a by-product was removed by filtration to collect the filtrate, and the solvent was distilled off from the filtrate, thereby obtaining a dark violet pigment of Example 5 represented by Formula (12).

Example 6

"Preparation of Dark Violet Pigment"

0.1 mmol of 4,4'-dibromo-2,2'-dihydroxyazobenzene as a ligand, 0.1 mmol of dichlorodiphenylgermanium as a metal source, 20 mL of tetrahydrofuran, and 0.09 mL of triethylamine were mixed to prepare a mixed solution.

Next, the mixed solution was stirred for 6 hours at room temperature to carry out a deacidification reaction, and the metal source was coordinated with the ligand.

Next, a salt of a by-product was removed by filtration to collect the filtrate, and the solvent was distilled off from the filtrate, thereby obtaining a dark violet pigment of Example 6 represented by Formula (13).

Example 7

"Preparation of Brown Pigment"

0.5 mol of triphenylbismuth, 1 mol of trichlorobismuth, and 50 mL of diethyl ether were mixed with each other. The mixed solution was stirred at room temperature for 1 hour to prepare a metal source, dichlorophenyl bismuth, thereby obtaining a prepared solution that contains the dichlorophenyl bismuth.

As a ligand, 0.7 mol of 4,4'-dibromo-2,2'-dihydroxyazobenzene, 5 mL of triethylamine, and 20 mL of tetrahydrofuran were mixed with each other to obtain a mixed solution. The mixed solution was added to the obtained solution prepared to contain the dichlorophenyl bismuth, and the mixture was stirred at room temperature for 24 hours to carry out the deacidification reaction to coordinate the metal source with the ligand.

Next, a salt of a by-product was removed by filtration to collect the filtrate, and the solvent was distilled off from the filtrate, thereby obtaining a brown pigment of Example 7 represented by Formula (14).

"Evaluation of Adsorption of Pigments of Examples 1 to 7 to metal hydroxyl group"

0.1 g of the pigment obtained in each of Examples 1 to 7 was dissolved in toluene to obtain a solution. The color of the solution was the same as the color of the pigment. In a case where zinc oxide particles (manufactured by Sumitomo Osaka Cement Co., Ltd.) having a specific surface area of 30 $m^2/g$ were added to the solution, it was observed that the pigment was adsorbed to the surface of the zinc oxide particles, and the color of the solution was lightened.

That is, it was confirmed that the pigment obtained in each of Examples 1 to 7 was selectively adsorbed to the metal hydroxyl group on the surface of the zinc oxide particles.

Example 8

"Preparation of Solution Containing Red Pigment"

250 nmol (0.12 mg) of the red pigment of Example 1 was dissolved in toluene to obtain 5 mL of a solution, thereby obtaining a $5\times10^{-5}$ mol/L solution of Example 8. As a result of visually observing the color of the obtained solution, the color of the solution was red violet.

"Evaluation of stabilities of pigments of Examples 1 to 7 and solution of Example 8"

The pigments of Examples 1 to 7 and the solution of Example 8 were individually placed in screw tubes and left to stand at room temperature (25° C.) for 1 month.

As a result of visually observing the colors of the pigments of Examples 1 to 7 and the color of the solution of Example 8 before being left to stand and one month after being left to stand, no change in the colors of the pigments was observed.

Based on this evaluation, it was confirmed that the pigments of Examples 1 to 7 were stable compounds which did not react with moisture in the atmosphere, the color of the pigment did not change even in a solution state, and the performance of selective adsorption to a metal hydroxyl group was stable.

Example 9

"Qualitative Evaluation of Metal Hydroxyl Amount"

Zinc oxide particles of which the surface was not surface-treated (hereinafter, referred to as "zinc oxide particles 1") were prepared.

The zinc oxide particles 1 were surface-treated with octyltriethoxysilane to prepare surface-treated zinc oxide particles (hereinafter, referred to as "surface-treated zinc oxide particles 2"). The content of octyltriethoxysilane was 6% by mass with respect to the total amount (100% by mass) of the surface-treated zinc oxide particles 2.

To the solution of Example 8 was added 3 mg of the zinc oxide particles 1, and the mixture was stirred and mixed at 60° C. for 4 hours to prepare a mixed solution A. In the mixed solution A, the red pigment was adsorbed to the zinc oxide particles and precipitated, and the color of the solution thus changed to light orange.

In addition, to the solution of Example 8 was added 3 mg of the surface-treated zinc oxide particles 2, and the mixture was stirred and mixed at 60° C. for 4 hours to prepare a mixed solution B. In the mixed solution B, the zinc oxide particles were surface-treated, and the number of the metal hydroxyl groups on the particle surface was reduced. Thus, the red pigment was hardly adsorbed to the zinc oxide particles. Therefore, the color of the solution of the mixed solution B was red violet that was slightly lighter than the color of the solution of Example 8.

By comparing the color of the mixed solution A with the color of the mixed solution B, it was visually observed that the metal hydroxyl group on the surface of the zinc oxide particles 1 before the surface treatment was surface-treated with octyltriethoxysilane, and confirmed that the qualitative evaluation could be performed.

Example 10

[Metal Hydroxyl Treatment Proportion Evaluation]

Zinc oxide particles with a specific surface area of 35 $m^2/g$ (hereinafter, referred to as "zinc oxide particles 1") were prepared.

The zinc oxide particles 1 were surface-treated with octyltriethoxysilane to prepare surface-treated zinc oxide particles (hereinafter, referred to as "surface-treated zinc oxide particles 2"). The content of octyltriethoxysilane was 1% by mass with respect to the total amount (100% by mass) of the surface-treated zinc oxide particles 2.

To the solution (solution C) of Example 8 was added 4.1 mg of the zinc oxide particles 1, and the mixture was stirred and mixed at 60° C. for 4 hours to prepare a mixed solution A1. The zinc oxide particles 1 are removed from the mixed solution A1 by centrifugal separation to obtain a mixed solution A2 for evaluation.

In addition, to the solution (solution C) of Example 8 was added 4.0 mg of the surface-treated zinc oxide particles 2, and the mixture was stirred and mixed at 60° C. for 4 hours to prepare a mixed solution B1. The surface-treated zinc oxide particles 2 are removed from the mixed solution B1 by centrifugal separation to obtain a mixed solution B2 for evaluation.

The absorbances of the mixed solution A2 and the mixed solution B2 at a wavelength of 545 nm were measured using a spectrophotometer (model number: V-770, manufactured by JASCO Corporation). As a result, the absorbance of the mixed solution A2 was 0.403, and the absorbance of the mixed solution B2 was 0.444. In addition, the absorbance of the solution (solution C) of Example 8 was 0.74.

The reduction proportions of the absorbances of the mixed solution A2 and the mixed solution B2 were calculated.

Reduction proportion of absorbance of mixed solution A2=adsorption proportion of pigment to zinc oxide particles 1 contained in mixed solution A2=(absorbance of solution C−absorbance of mixed solution A2)/absorbance of solution C=0.455

Reduction proportion of absorbance of mixed solution B2=adsorption proportion of pigment to surface-treated zinc oxide particles 2 contained in mixed solution B2=(absorbance of solution C−absorbance of mixed solution B2)/absorbance of solution C=0.400

Since the reduction of the absorbance of the red pigment at a wavelength of 545 nm means that the pigment is being adsorbed, it can be converted into the reduction proportion of the absorbance=the adsorption proportion of the pigment.

The adsorption amount (mol/g) of the pigment per gram of particles contained in the mixed solution A was calculated.

Adsorption amount (mol/g) of pigment to zinc oxide particles 1=adsorption proportion of pigment to zinc oxide particles 1×amount (mol) of pigment/mass (g) of zinc oxide particles 1=0.455×250×$10^{-9}$ mol/4.1×$10^{-3}$ g=2.77×$10^{-5}$ mol/g Adsorption amount (mol/g) of pigment to surface-treated zinc oxide particles 2=adsorption proportion of pigment to surface-treated zinc oxide particles 2×amount (mol) of pigment/mass (g) of surface-treated zinc oxide particles 2=0.400×250×$10^{-9}$ mol/4.0×$10^{-3}$ g=2.50×$10^{-5}$ mol/g Next, the adsorption amount (mol/g) of the pigment was multiplied by the Avogadro constant (6.02×$10^{23}$ pieces/mol) to be converted into the adsorption amount (pieces/g) of the pigment.

Adsorption amount (pieces/g) of pigment to zinc oxide particles 1=adsorption amount (mol/g) of pigment to zinc oxide particles 1×Avogadro constant=2.77×$10^{-5}$×6.02×$10^{23}$ pieces/mol=1.67×$10^{19}$ (pieces/g)

Adsorption amount (pieces/g) of pigment to surface-treated zinc oxide particles 2=adsorption amount (mol/g) of pigment to surface-treated zinc oxide particles 2×Avogadro constant=2.50×$10^{-5}$×6.02×$10^{23}$ (pieces/mol)=1.51×$10^{19}$ (pieces/g)

As illustrated in FIG. 5, the red pigment of Example 1 reacts with the metal hydroxyl group present on the surface of the zinc oxide particles at a one-to-one ratio. Therefore, the adsorption amount (pieces/g) of the pigment means the amount (pieces/g) of the metal hydroxyl group present on the surface of the zinc oxide particles 1 or the surface-treated zinc oxide particles 2, that is, the amount (pieces/g) of the untreated metal hydroxyl group without surface treatment.

Therefore, the following is achieved: Amount (pieces/g) of untreated metal hydroxyl group of zinc oxide particles 1=adsorption amount (pieces/g) of pigment to zinc oxide particles 1=1.67×$10^{19}$ (pieces/g).

In addition, the following is also achieved: Amount (pieces/g) of untreated metal hydroxyl group of surface-treated zinc oxide particles 2=adsorption amount (pieces/g) of pigment to surface-treated zinc oxide particles 2=1.51×$10^{19}$ (pieces/g).

Next, the amount (pieces/g) of the untreated metal hydroxyl group was divided by the specific surface area of the zinc oxide particles to calculate the amount (pieces/$m^2$) of the untreated metal hydroxyl group per unit area of the zinc oxide particles.

Amount of untreated metal hydroxyl group (pieces/$m^2$) per unit area of zinc oxide particles 1=amount of untreated metal hydroxyl group (pieces/g) of zinc oxide particles 1/specific surface area ($m^2$/g) of zinc oxide particles 1=4.77×$10^{17}$ (pieces/$m^2$)

Amount of untreated metal hydroxyl group (pieces/$m^2$) per unit area of surface-treated zinc oxide particles 2=amount of untreated metal hydroxyl group (pieces/g) of surface-treated zinc oxide particles 2/specific surface area ($m^2$/g) of zinc oxide particles 2 before surface treatment=4.30×$10^{17}$ (pieces/$m^2$)

Next, the treatment proportion (surface treatment proportion) of the metal hydroxyl group present on the surface of the zinc oxide particles was calculated by the following calculation.

Treatment proportion (%) of metal hydroxyl group of zinc oxide particles 1=100−(amount (pieces/$m^2$) of untreated metal hydroxyl group of zinc oxide particles 1/amount (pieces/$m^2$) of untreated metal hydroxyl group of zinc oxide particles 1×100)=0

Treatment proportion (%) of metal hydroxyl group of surface treated zinc oxide particles 2=100−(amount (pieces/$m^2$) of untreated metal hydroxyl group of surface treated zinc oxide particles 2/amount (pieces/$m^2$) of untreated metal hydroxyl group of zinc oxide particles 1×100)=9.8

The larger the metal hydroxyl treatment proportion, the more the metal hydroxyl group present on the surface of the zinc oxide particles is surface-treated and becomes hydrophobic.

Surface-treated zinc oxide particles 3 with a content of octyltriethoxysilane of 2% by mass with respect to the zinc oxide particles, surface-treated zinc oxide particles 4 with a content of octyltriethoxysilane of 4% by mass with respect to the zinc oxide particles, surface-treated zinc oxide particles 5 with a content of octyltriethoxysilane of 6% by mass with respect to the zinc oxide particles, and surface-treated zinc oxide particles 6 with a content of octyltriethoxysilane of 8% by mass with respect to the zinc oxide particles were prepared.

Figure 7:
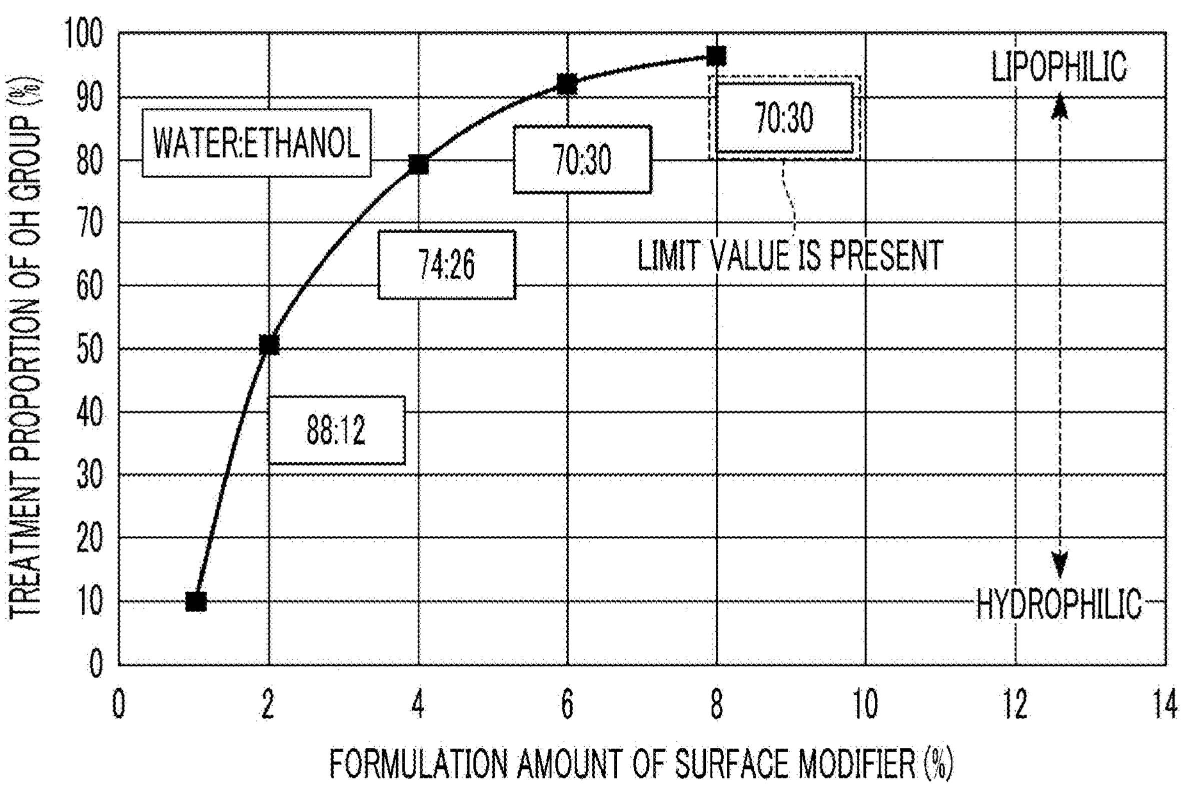
FIG. 7 is a graph illustrating a metal hydroxyl treatment proportion at the surface of a zinc oxide particle with respect to the content of octyltriethoxysilane in Example 10.

Next, the evaluation was performed in the same manner as in the surface-treated zinc oxide particles 2, and a metal hydroxyl treatment proportion on the surface of the zinc oxide particles was calculated. Table 1 illustrates the evaluation result and the calculation result. In Table 1, OTS means octyltriethoxysilane used for the surface treatment. In addition, FIG. 7 illustrates a graph of the metal hydroxyl treatment proportion with respect to the content of octyltriethoxysilane. In FIG. 7, the metal hydroxyl treatment proportions of the surface-treated zinc oxide particles 2 to 6 measured and calculated in Example 10 are indicated by black square points.

Comparative Example 1

"Metal Hydroxyl Treatment Proportion Evaluation by Limit Ethanol Method"

The surface-treated zinc oxide particles 3 to the surface-treated zinc oxide particles 6 used in Example 10 were evaluated by the limit ethanol method.

The limit ethanol method is a method of preparing a solution obtained by mixing water and ethanol, adding a sample to the solution, and observing whether or not the sample precipitates. In addition, in the limit ethanol method, the ethanol proportion is increased in a case where the sample does not precipitate, and the water proportion is increased in a case where the sample precipitates. In this way, this is a method for evaluating the hydrophobicity of the surface of the metal oxide particles by the ethanol ratio (the limit ethanol ratio) required for the sample to precipitate. As the ethanol proportion is higher, the surface of the metal oxide particles is more hydrophobic, which indicates that the metal hydroxyl treatment proportion is higher.

The mass ratio of water/ethanol in which the surface-treated zinc oxide particles 3 to the surface-treated zinc oxide particles 6 precipitated was evaluated by observation. The results are illustrated in Table 1. In addition, for reference, the limit ethanol ratios of the surface-treated zinc oxide particles 3 to 6 obtained in Comparative Example 1 are illustrated in white squares in FIG. 7.

In both the surface-treated zinc oxide particles 5 having a content of octyltriethoxysilane of 6% by mass and the surface-treated zinc oxide particles 6 having a content of octyltriethoxysilane of 8% by mass, the mass ratio of water/ethanol was 70:30, and thus the difference between the surface treatment states could not be quantitatively evaluated.

TABLE 1

| | Particles 1 | Particles 2 | Particles 3 | Particles 4 | Particles 5 | Particles 6 |
|---|---|---|---|---|---|---|
| Specific surface area ($m^2$/g) | 35 | 35 | 35 | 35 | 35 | 35 |
| Amount of OTS (%) | 0 | 1 | 2 | 4 | 6 | 8 |
| Addition amount of particles | 4.1 | 4.0 | 4.1 | 4.0 | 3.9 | 3.8 |
| Absorbance at a wavelength of 545 nm (Abs.) | 0.403 | 0.444 | 0.573 | 0.672 | 0.715 | 0.729 |
| Reduction proportion of absorbance = adsorption proportion of pigment | 0.455 | 0.400 | 0.226 | 0.092 | 0.034 | 0.015 |
| Adsorption amount of pigment (mol/g) | $2.77 \times 10^{-5}$ | $2.50 \times 10^{-5}$ | $1.38 \times 10^{-5}$ | $5.77 \times 10^{-6}$ | $2.19 \times 10^{-6}$ | $1.01 \times 10^{-6}$ |
| Adsorption amount of pigment (pieces/g) | $1.67 \times 10^{19}$ | $1.51 \times 10^{19}$ | $8.30 \times 10^{18}$ | $3.47 \times 10^{18}$ | $1.32 \times 10^{18}$ | $6.06 \times 10^{17}$ |
| Amount of untreated metal hydroxyl group (pieces/$m^2$) | $1.67 \times 10^{19}$ | $1.51 \times 10^{19}$ | $8.30 \times 10^{18}$ | $3.47 \times 10^{18}$ | $1.32 \times 10^{18}$ | $6.06 \times 10^{17}$ |
| Amount of untreated metal hydroxyl group per unit area (pieces/$m^2$) | $4.77 \times 10^{17}$ | $4.30 \times 10^{17}$ | $2.37 \times 10^{17}$ | $9.92 \times 10^{16}$ | $3.77 \times 10^{16}$ | $1.73 \times 10^{16}$ |
| Metal hydroxyl treatment proportion (%) | 0 | 9.8 | 50.3 | 79.2 | 92.1 | 96.4 |
| Limit ethanol ratio (water:ethanol) | — | — | 88:12 | 74:26 | 70:30 | 70:30 |

Example 11

20 μL of methyltrimethoxysilane (manufactured by Shin-Etsu Chemical Co., Ltd.) was added to the solution of Example 8 and stirred and mixed at 60° C. for 4 hours to prepare a mixed-for solution A. The color of the mixed solution A was substantially the same as that of the solution of Example 8.

2 g of methyltrimethoxysilane and 0.79 g of water were mixed at 25° C. for 3 hours to carry out the hydrolysis reaction, thereby obtaining a hydrolysis solution.

In a case where the obtained hydrolysis solution was gradually added to the solution of Example 8, it was confirmed that the color of the solution changed from red violet to yellow.

From the results of Example 11, it was confirmed that the pigment of the present example can evaluate not only the metal hydroxyl group on the surface of the metal oxide particles but also the degree of progression of the hydrolysis reaction.

INDUSTRIAL APPLICABILITY

The present invention provides the pigment capable of being adsorbed to the metal hydroxyl group, the method for producing the pigment, the solution containing the pigment, the metal hydroxyl amount evaluation method using the pigment, and the metal hydroxyl treatment proportion evaluation method. The present invention can provide the pigment that is selectively adsorbed to the metal hydroxyl group contained in the sample and does not react with a hydroxyl group of water or alcohol. The pigment of the present invention can be used to easily evaluate the amount of the metal hydroxyl group contained in the sample. Therefore, the industrial value when the pigment of the present invention is used as a reagent is large.

The invention claimed is:

1. A metal hydroxyl amount evaluation method comprising:

a step of preparing a solution and a sample;

a step of evaluating a color x of the solution;

a step of adding the sample to the solution to prepare a mixed solution A and evaluating a color a of the mixed solution A; and a step of evaluating a difference between the color x and the color a and evaluating a metal hydroxyl amount of the sample from an evaluation result obtained, wherein the solution comprises:

a pigment that is a compound represented by General Formula (1) or General Formula (2); and an organic solvent, wherein a concentration of the pigment is $1 \times 10^{-10}$ mol/L or more and 1 mol/L or less, (1)

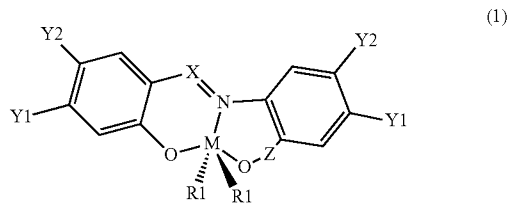

in Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3);

(2)

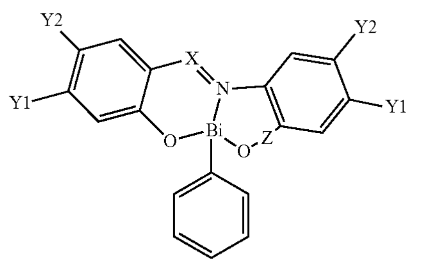

in Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3); and (3)

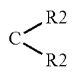

in Formula (3), R2 is an alkyl group or a phenyl group.

2. The metal hydroxyl amount evaluation method according to claim 1, wherein each of the color x and the color a represents an absorbance.

3. The metal hydroxyl amount evaluation method according to claim 2, wherein in the step of evaluating the metal hydroxyl amount of the sample, the metal hydroxyl amount is calculated with the absorbance.

4. The metal hydroxyl amount evaluation method according to claim 1, wherein the evaluation result is a result obtained by visual observation on the solution and the mixed solution A.

5. A metal hydroxyl amount evaluation method comprising:

a step of preparing a solution, a sample 1, and a sample 2;

a step of adding the sample 1 to the solution to prepare a mixed solution A and evaluating a color a of the mixed solution A;

a step of adding the sample 2 to the solution to prepare a mixed solution B and evaluating a color b of the mixed solution B; and a step of evaluating a difference between the obtained color a and the obtained color b and evaluating a difference between a metal hydroxyl amount a of the sample 1 and a metal hydroxyl amount b of the sample 2 from an evaluation result obtained, wherein the solution comprises:

a pigment that is a compound represented by General Formula (1) or General Formula (2); and an organic solvent, wherein a concentration of the pigment is $1\times10^{-10}$ mol/L or more and 1 mol/L or less, (1)

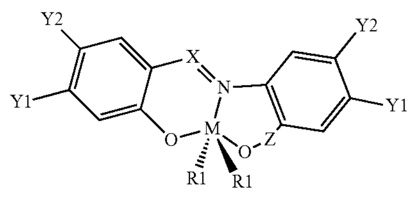

in Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3);

(2)

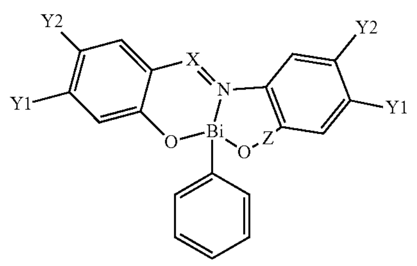

in Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3); and (3)

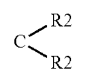

in Formula (3), R2 is an alkyl group or a phenyl group.

6. The metal hydroxyl amount evaluation method according to claim 5, wherein each of the color a and the color b represents an absorbance.

7. The metal hydroxyl amount evaluation method according to claim 5, wherein the evaluation result is a result obtained by visual observation on the mixed solution A and the mixed solution B.

8. A metal hydroxyl amount evaluation method comprising:

a step of preparing a solution, a sample 1, and a sample 2;

a step of evaluating a color x of the solution;

a step of adding the sample 1 to the solution to prepare a mixed solution A and evaluating a color a1 of the mixed solution A;

a step of adding the sample 2 to the solution to prepare a mixed solution B and evaluating a color b1 of the mixed solution B;

a step of evaluating a difference between the color x and the color a1 obtained, and evaluating a metal hydroxyl amount a of the sample 1 from an evaluation result obtained;

a step of evaluating a difference between the color x and the color b1 obtained, and evaluating a metal hydroxyl amount b of the sample 2 from an evaluation result obtained; and a step of evaluating a difference between the metal hydroxyl amount a and the metal hydroxyl amount b, wherein the solution comprises:

a pigment that is a compound represented by General Formula (1) or General Formula (2); and an organic solvent, wherein a concentration of the pigment is $1\times10^{-10}$ mol/L or more and 1 mol/L or less, (1)

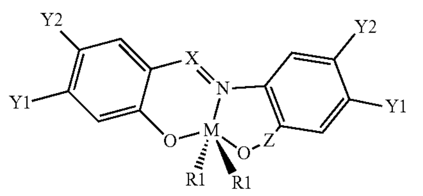

in Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3);

(2)

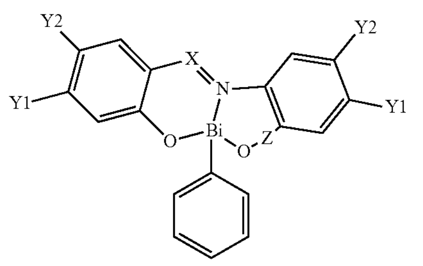

in Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3); and (3)

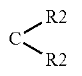

in Formula (3), R2 is an alkyl group or a phenyl group.

9. The metal hydroxyl amount evaluation method according to claim 8, wherein each of the color x, the color a1, and the color b1 represents an absorbance.

10. The metal hydroxyl amount evaluation method according to claim 9, wherein in the step of evaluating the metal hydroxyl amount a and the step of evaluating the metal hydroxyl amount b, the metal hydroxyl amount a and the metal hydroxyl amount b are calculated with the absorbance.

11. A metal hydroxyl treatment proportion evaluation method for a surface of a metal oxide particle in a case where a surface treatment is performed with a surface treatment agent on the metal oxide particle, the metal hydroxyl treatment proportion evaluation method comprising:

a step of preparing a solution, a metal oxide particle 1 before the surface treatment, and a metal oxide particle 2 after the surface treatment is performed on the metal oxide particle 1;

a step of measuring an absorbance x of the solution;

a step of adding the metal oxide particle 1 before the surface treatment to the solution to prepare a mixed solution A and measuring an absorbance a1 of the mixed solution A;

a step of adding the metal oxide particle 2 after the surface treatment to the solution to prepare a mixed solution B and measuring an absorbance b1 of the mixed solution B;

a step of calculating a reduction proportion a2 of the absorbance of the mixed solution A by subtracting the absorbance a1 from the absorbance x to obtain a value and dividing the obtained value by the absorbance x ((x−a1)/x);

a step of calculating a reduction proportion b2 of the absorbance of the mixed solution B by subtracting the absorbance b1 from the absorbance x to obtain a value and dividing the obtained value by the absorbance x ((x−b1)/x);

a step of calculating an adsorption amount a3 (mol/g) of the pigment to the metal oxide particle 1 by multiplying the reduction proportion a2 of the absorbance by the number of moles of a pigment contained in the mixed solution A to obtain a value and dividing the obtained value by an addition amount of the metal oxide particle 1 to the solution A (a2×the number of moles of the pigment contained in the mixed solution A/the addition amount of the metal oxide particle 1 to the solution A);

a step of calculating an adsorption amount b3 (mol/g) of the pigment to the metal oxide particle 2 by multiplying the reduction proportion b2 of the absorbance by the number of moles of the pigment contained in the mixed solution B to obtain a value and dividing the obtained value by an addition amount of the metal oxide particle 2 to the solution B (b2×the number of moles of the pigment contained in the mixed solution B/the addition amount of the metal oxide particle 2 to the solution B); and a step of calculating a metal hydroxyl treatment proportion obtained as a result of the surface treatment by dividing the adsorption amount b3 by the adsorption amount a3 to obtain a value, multiplying the obtained value by 100 to obtain a value, and subtracting the obtained value from 100 (100−((b3/a3)×100)), wherein the solution comprises:

a pigment that is a compound represented by General Formula (1) or General Formula (2); and an organic solvent, wherein a concentration of the pigment is $1\times10^{-10}$ mol/L or more and 1 mol/L or less, (1)

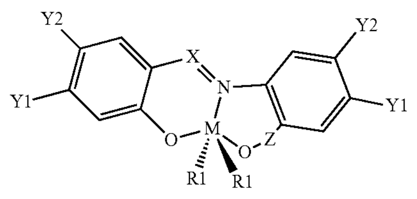

in Formula (1), M is Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3);

(2)

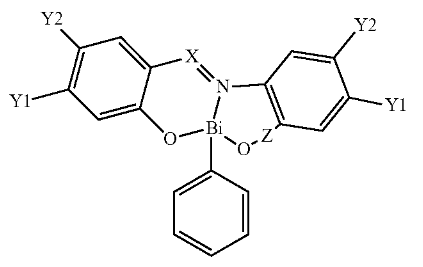

in Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3); and (3)

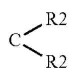

in Formula (3), R2 is an alkyl group or a phenyl group.

12. A metal hydroxyl residual proportion evaluation method for a surface of a metal oxide particle in a case where a surface treatment is performed with a surface treatment agent on the metal oxide particle, the metal hydroxyl residual proportion evaluation method comprising:

a step of preparing a solution, a metal oxide particle 1 before the surface treatment, and a metal oxide particle 2 after the surface treatment is performed on the metal oxide particle 1;

a step of measuring an absorbance x of the solution;

a step of adding the metal oxide particle 1 before the surface treatment to the solution to prepare a mixed solution A and measuring an absorbance a1 of the mixed solution A;

a step of adding the metal oxide particle 2 after the surface treatment to the solution to prepare a mixed solution B and measuring an absorbance b1 of the mixed solution B;

a step of calculating a reduction proportion a2 of the absorbance of the mixed solution A by subtracting the absorbance a1 from the absorbance x to obtain a value and dividing the obtained value by the absorbance x ((x−a1)/x);

a step of calculating a reduction proportion b2 of the absorbance of the mixed solution B by subtracting the absorbance b1 from the absorbance x to obtain a value and dividing the obtained value by the absorbance x ((x−b1)/x);

a step of calculating an adsorption amount a3 (mol/g) of the pigment to the metal oxide particle 1 by multiplying the reduction proportion a2 of the absorbance by the number of moles of a pigment contained in the mixed solution A to obtain a value and dividing the obtained value by an addition amount of the metal oxide particle 1 to the solution A ((a2×the number of moles of the pigment contained in the mixed solution A)/the addition amount of the metal oxide particle 1 to the solution A);

a step of calculating an adsorption amount b3 (mol/g) of the pigment to the metal oxide particle 2 by multiplying the reduction proportion b2 of the absorbance by the number of moles of the pigment contained in the mixed solution B to obtain a value and dividing the obtained value by an addition amount of the metal oxide particle 2 to the solution B ((b2×the number of moles of the pigment contained in the mixed solution B)/the addition amount of the metal oxide particle 2 to the solution B); and a step of calculating a metal hydroxyl residual proportion to be obtained as a result of the surface treatment by dividing the adsorption amount b3 by the adsorption amount a3 to obtain a value and multiplying the obtained value by 100 ((b3/a3)×100), wherein the solution comprises:

a pigment that is a compound represented by General Formula (1) or General Formula (2); and an organic solvent, wherein a concentration of the pigment is $1\times10^{-10}$ mol/L or more and 1 mol/L or less, (1)

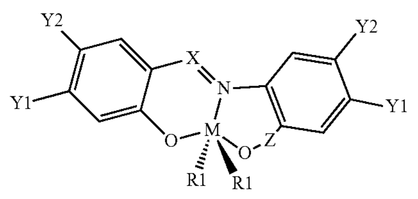

in Formula (1), Mis Sn or Ge, X is C or N, R1 is an alkyl group or a phenyl group, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3);

(2)

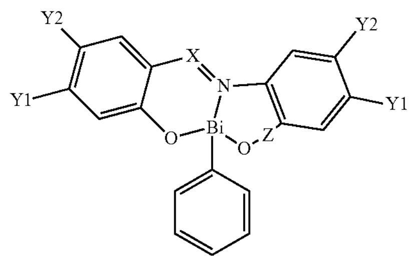

in Formula (2), X is C or N, Y1 and Y2 are each hydrogen, a halogen group, a methyl group, an alkoxy group, a phenyl group, a diphenylamide group, a thiophenyl group, or a phenylethynyl group, and Z is a single bond or represented by Formula (3); and (3)

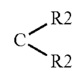

in Formula (3), R2 is an alkyl group or a phenyl group.

* * * * *